United States Patent
Ciochina et al.

(10) Patent No.: US 11,652,542 B2
(45) Date of Patent: May 16, 2023

(54) DEVICE AND METHOD FOR INSERTING QUADRUPLET AND DEVICE AND METHOD FOR EXTRACTING QUADRUPLET

(71) Applicant: MITSUBISHI ELECTRIC CORPORATION, Tokyo (JP)

(72) Inventors: Cristina Ciochina, Rennes (FR); Arnaud Bouttier, Rennes (FR); Jean-Christophe Sibel, Rennes (FR)

(73) Assignee: Mitsubishi Electric Corporation, Tokyo (JP)

( * ) Notice: Subject to any disclaimer, the term of this patent is extended or adjusted under 35 U.S.C. 154(b) by 60 days.

(21) Appl. No.: 16/967,689

(22) PCT Filed: Feb. 18, 2019

(86) PCT No.: PCT/JP2019/006931
§ 371 (c)(1),
(2) Date: Aug. 5, 2020

(87) PCT Pub. No.: WO2019/181372
PCT Pub. Date: Sep. 26, 2019

(65) Prior Publication Data
US 2021/0036773 A1    Feb. 4, 2021

(30) Foreign Application Priority Data

Mar. 22, 2018 (EP) .................................. 18305322

(51) Int. Cl.
*H04B 7/208* (2006.01)
*H04B 7/0456* (2017.01)
*H04B 7/0413* (2017.01)
*H04L 27/26* (2006.01)
(Continued)

(52) U.S. Cl.
CPC .......... *H04B 7/208* (2013.01); *H04B 7/0456* (2013.01); *H04B 7/2126* (2013.01); *H04L 1/0643* (2013.01)

(58) Field of Classification Search
USPC ........................................................ 370/334
See application file for complete search history.

(56) References Cited

U.S. PATENT DOCUMENTS

2017/0163324 A1* 6/2017 Nishimoto ............ H04L 1/0058
2019/0372737 A1* 12/2019 Hao ..................... H04B 7/0697

FOREIGN PATENT DOCUMENTS

| EP | 3832923 A1 * | 6/2021 | ........... H04B 7/0404 |
| TW | 201110599 A * | 3/2011 | ............... H04B 7/06 |
| WO | WO-2016096039 A1 * | 6/2016 | ........... H04L 1/0625 |

OTHER PUBLICATIONS

Mitsubishi Electric, 3GPP TSG-RAN WG1 RAN1#88 R1-1701925 (Year: 2017).*

(Continued)

*Primary Examiner* — Jeffrey M Rutkowski
*Assistant Examiner* — Luna Weissberger
(74) *Attorney, Agent, or Firm* — Birch, Stewart, Kolasch & Birch, LLP

(57) ABSTRACT

The invention relates to inserting reference signals in a radio signal to be transmitted over a wireless communication system, the radio signal being emitted according to a specific SS-STBC scheme, the method comprising, inserting the reference signals to transmit them in the radio signal such as samples of these reference signals are in specific positions in the SS-STBC symbol.

20 Claims, 10 Drawing Sheets

(51) Int. Cl.
   *H04B 7/212*   (2006.01)
   *H04L 1/06*    (2006.01)

(56) References Cited

OTHER PUBLICATIONS

Mitsubishi Electric, PAPR preserving SFBC for DFTsOFDM, Feb. 13-17, 2017, 3GPP TSG-RAN WG1 RAN1#88 R1-1701925 (Year: 2017).*

"Low PAPR SFBC for V2X transmit diversity", 3GPP TSG-RAN WG1 #92, R1-1802250, Mitsubishi Electric, 6.2.3.3.1 Transmit diversity solutions, Discussion/Decision, Feb. 26-Mar. 2, 2018, total of 10 pages.

"On UL diversity transmission scheme", 3GPP TSG RAN WG1 Meeting NR#3, R1-1716730, 6.2.1.4, Qualcomm Incorporated, Discussion/Decision, Sep. 18-21, 2017, total of 20 pages.

International Search Report for PCT/JP2019/006931 (PCT/ISA/210) dated May 17, 2019.

Luo et al., "Transmit Diversity Scheme over Single SC-FDM Symbol for LTE-Advanced", Global Telecommunications Conference, GLOBECOM 2009, IEEE, Nov. 30, 2009, total of 6 pages.

Written Opinion of the International Searching Authority for PCT/JP2019/006931 (PCT/ISA/237) dated May 17, 2019.

* cited by examiner

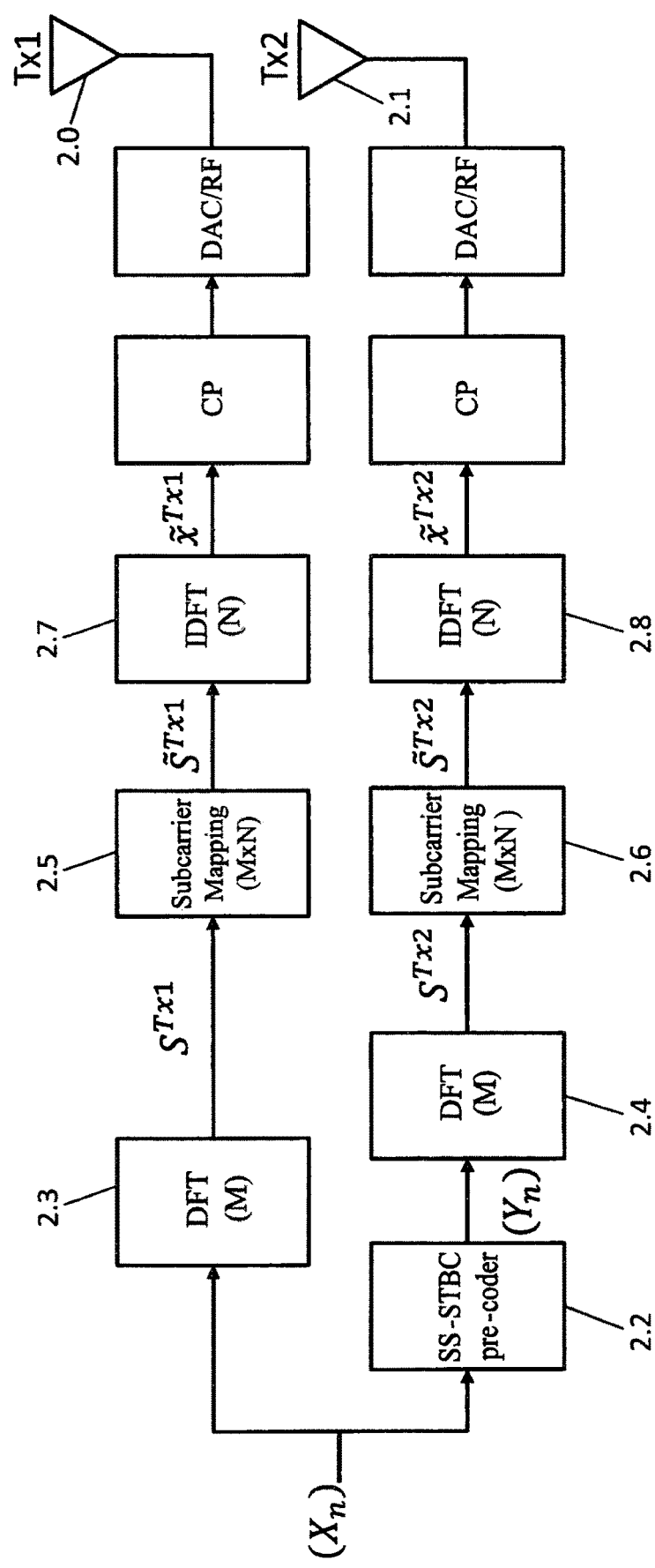
FIG. 2.1

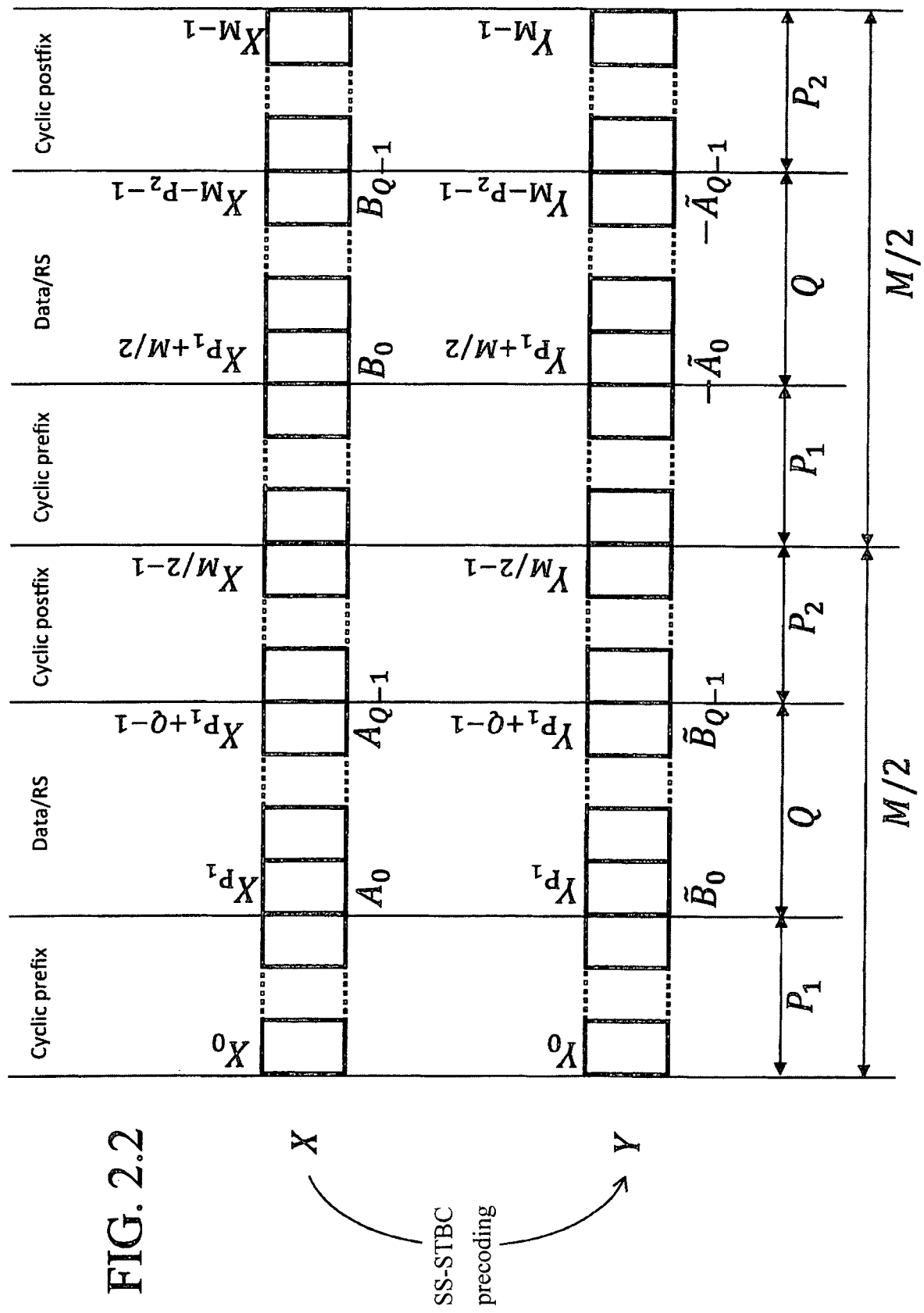
FIG. 2.2

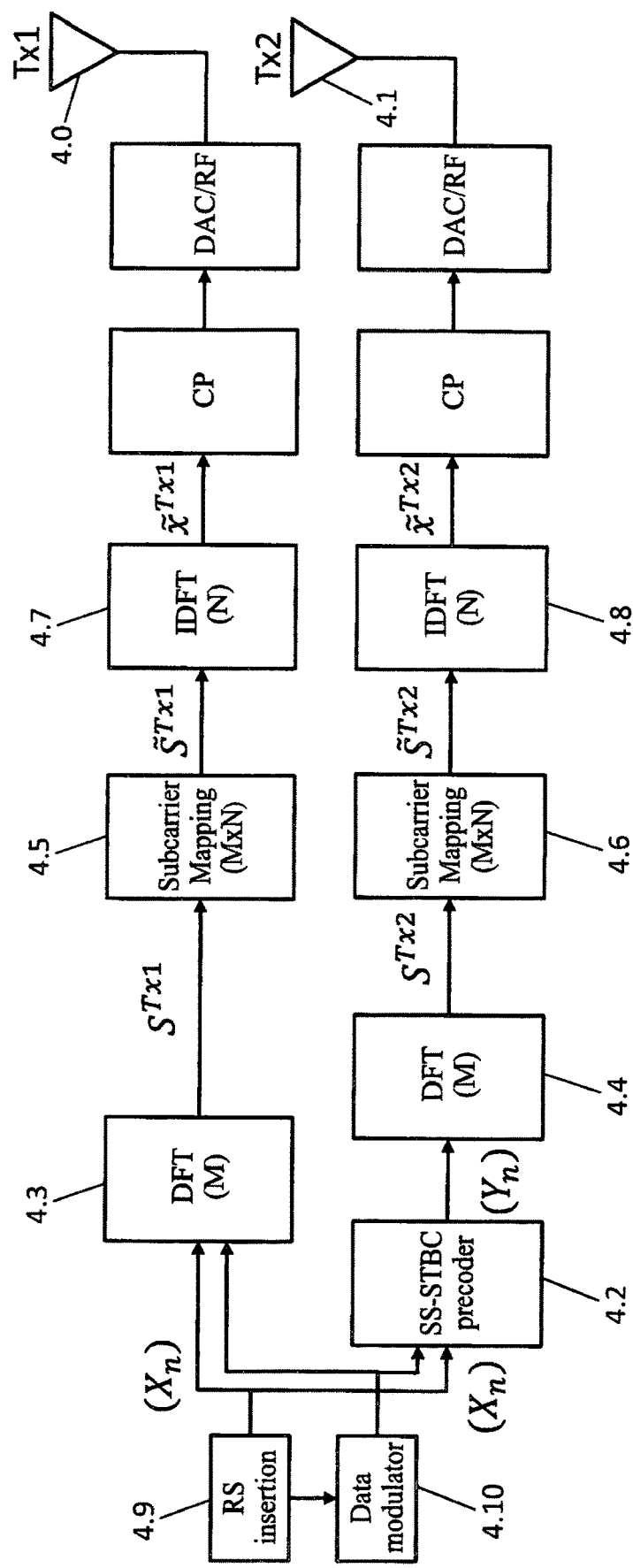
FIG. 4.1

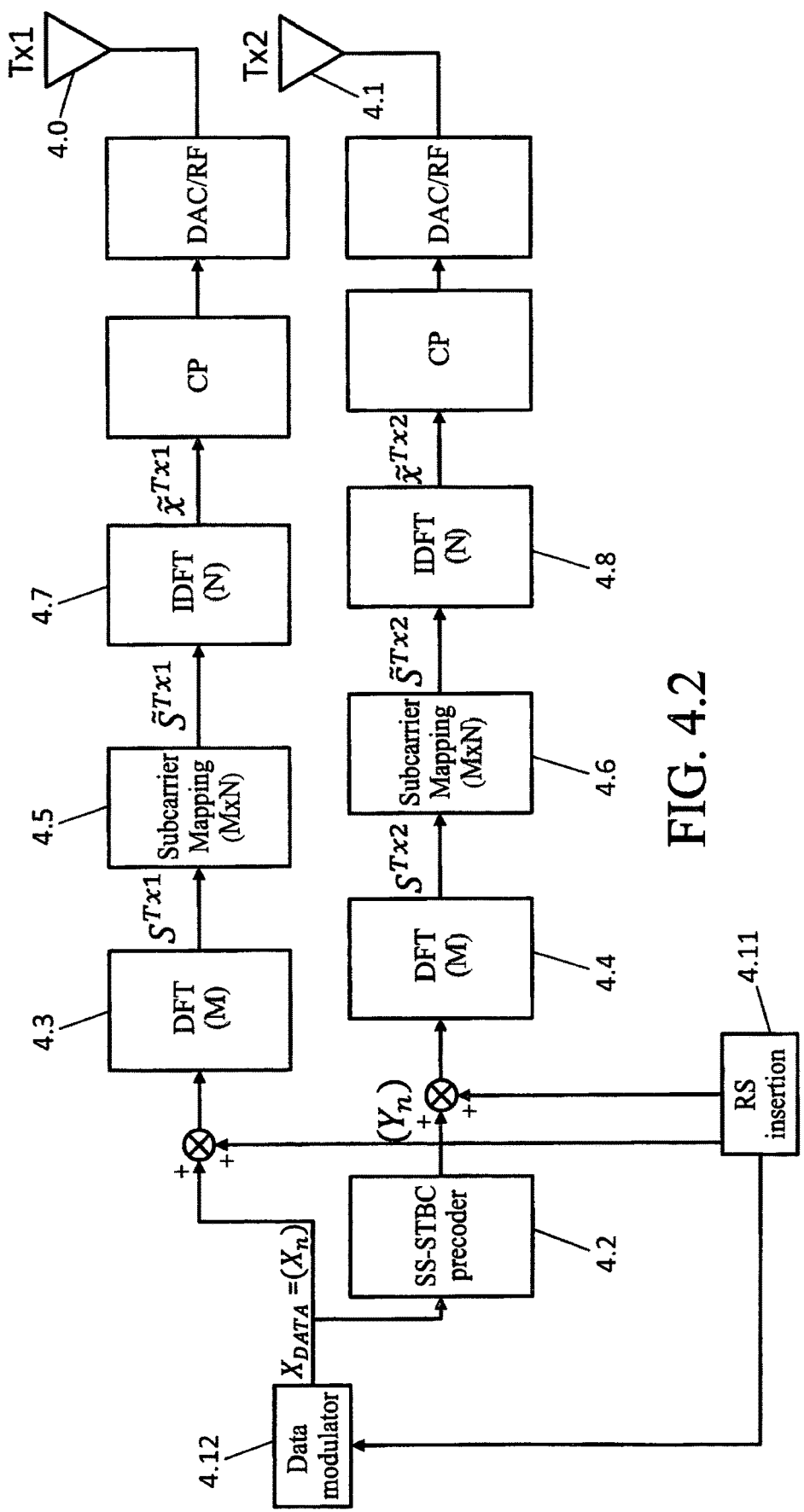
FIG. 4.2

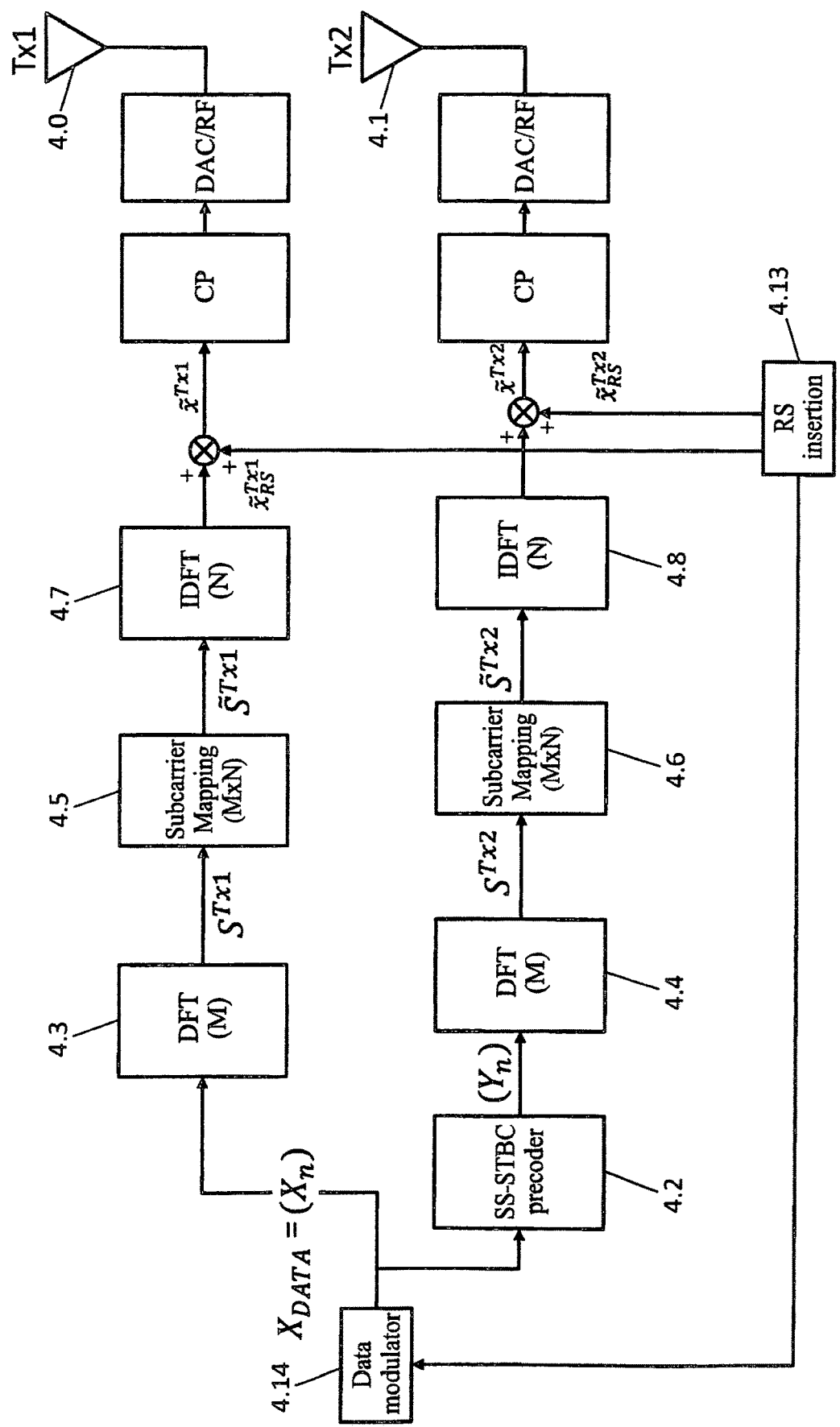
FIG. 4.3

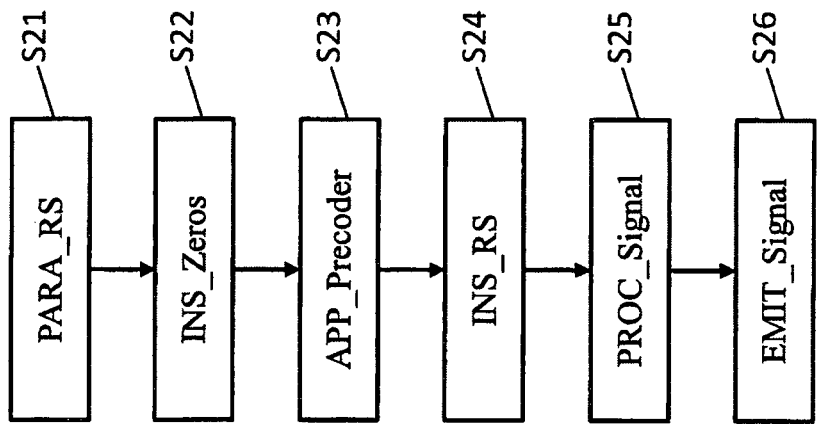
FIG. 6.2
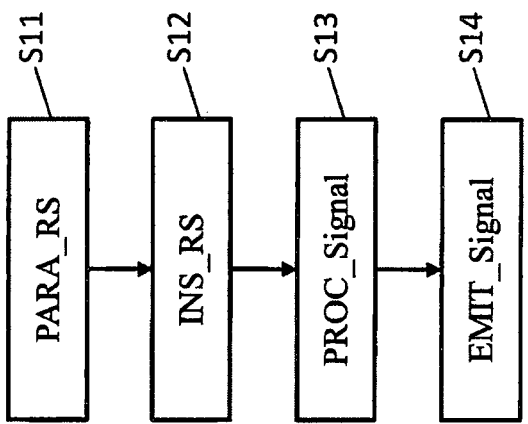
FIG. 6.1

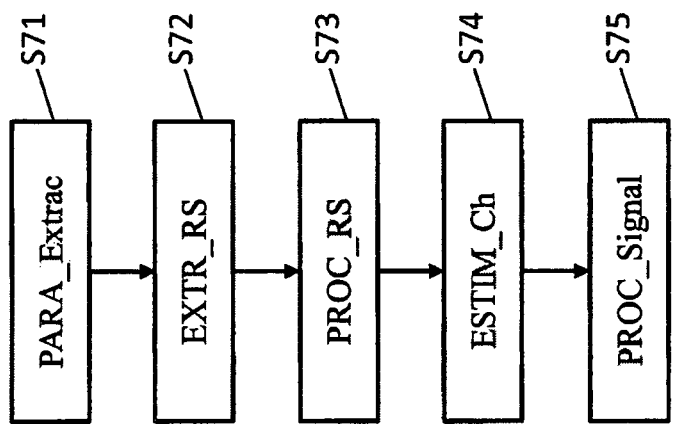
FIG. 7
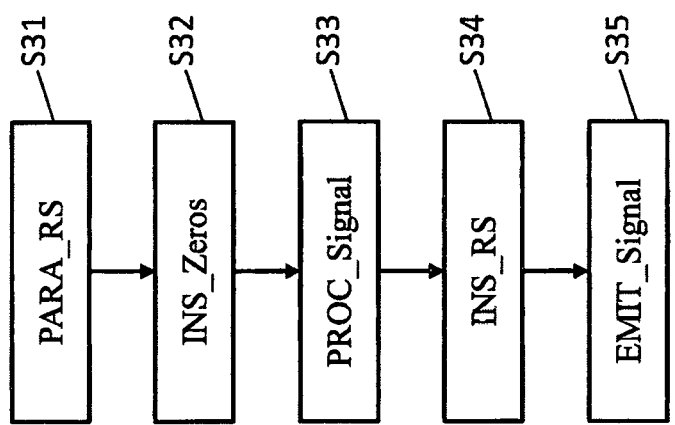
FIG. 6.3

DEVICE AND METHOD FOR INSERTING QUADRUPLET AND DEVICE AND METHOD FOR EXTRACTING QUADRUPLET

TECHNICAL FIELD

The present invention generally relates to the domain of telecommunication system, and more specifically the insertion of reference signals in the context of MIMO (Multiple Input Multiple Output) or MISO (Multiple Input Single Output) communications especially used in combination of OFDM-like transmission schemes.

BACKGROUND ART

The present invention applies in MIMO or MISO telecommunication systems using single-symbol STBC (SS-STBC) or variants of SS-STBC. SS-STBC is also referred to as one-symbol STBC, split-symbol STBC or virtual split STBC. These SS-STBC-like schemes have been developed to offer low PAPR (peak-to-average power ratio), full diversity in the context of MISO or MIMO transmission and to preserve the single carrier property of the OFDM-like schemes.

SS-STBC consists in applying a SS-STBC pre-coder to a block of symbols $X=(X_0, \ldots X_{M-1})$ to obtain a block of symbols $Y=(Y_0, \ldots Y_{M-1})$. Then an M-size DFT (discrete Fourier transform) is applied to each block of symbols X and Y. For each block of symbols, M complex symbols are obtained in the frequency domain, which are respectively $(S_k^{Tx1})_{k \in [0;M-1]}$ and $(S_k^{Tx2})_{k \in [0;M-1]}$. These complex symbols are mapped in the frequency domain to M out of N inputs of a N-size IDFT (inverse discrete Fourier transform), obtaining thus at the output of the IDFTs a signal $\tilde{x}^{Tx1}=(\tilde{x}^{Tx1}_0, \ldots, \tilde{x}^{Tx1}_{N-1})$ and a signal $\tilde{x}^{Tx2}=(\tilde{x}^{Tx2}_0, \ldots, \tilde{x}^{Tx2}_{N-1})$ each signal occupying, during a time interval corresponding to a single-carrier frequency division multiple access, SC-FDMA, symbol, M allocated subcarriers out of the N existing subcarriers. The signals $\tilde{x}^{Tx1}$ and $\tilde{x}^{Tx2}$ are time-domain signal whose frequency-domain representations, during a given time interval, are respectively the complex symbols $S_k^{Tx1}$ and $S_k^{Tx2}$ for each $k^{th}$ occupied subcarrier with $k=0$ to $M-1$. Equivalently, the time-domain signals $\tilde{x}^{Tx1}$ and $\tilde{x}^{Tx2}$ during a given time interval represent respectively the frequency domain complex symbols $S_k^{Tx1}$ and $S_k^{Tx2}$ for each $k^{th}$ frequency with $k=0$ to $M-1$. These time-domains signals $\tilde{x}^{Tx1}$ and $\tilde{x}^{Tx2}$ respectively correspond to SC-FDMA symbols. Therefore, samples in the signal $\tilde{x}^{Tx1}$ or in the signal $\tilde{x}^{Tx2}$ refer respectively to samples in a SC-FDMA symbol corresponding to a first transmit antenna and to samples in a SC-FDMA symbol corresponding to a second transmit antenna. A cyclic prefix (CP) can be optionally appended after IDFT.

The pre-coder applied to the block of symbols $X=(X_0, \ldots X_{M-1})$ (also referred as the first block of symbols) outputs the block of symbols $Y=(Y_0, \ldots Y_{M-1})$ (also referred as the second block of symbols). The first block of symbols $X=(X_0, \ldots X_{M-1})$ is divided in two parts of M/2 symbols as showed on FIG. 2.2. The first, respectively the second part, contains Q contiguous modulation symbols $(A_n)_{n \in [0;Q-1]}$, respectively contiguous symbols $(B_n)_{n \in [0;Q-1]}$. The Q contiguous modulation symbols of the first part and the second part contain data and/or reference signals.

To limit the interference between the two parts of the block symbols, the first part may contain an optional cyclic prefix of $P_1$ contiguous symbols and/or an optional cyclic postfix of $P_2$ contiguous symbols respectively positioned before and after the Q contiguous modulation symbols $(A_n)_{n \in [0;Q-1]}$. The second part may also contain an optional cyclic prefix of $P_1$ contiguous symbols and an optional cyclic postfix of $P_2$ contiguous symbols respectively positioned before and after the Q contiguous modulation symbols $(B_n)_{n \in [0;Q-1]}$. The first part contains P1 symbols in the cyclic prefix, P2 symbols in the cyclic postfix and Q data/RS symbols. Therefore $P_1+P_2+Q=M/2$, where $P_1$ and/or $P_2$ can be equal to zero. M is considered to be even.

Therefore, the first block of symbols $X=(X_0, \ldots X_{M-1})$ can be defined by:

$X_0=A_{Q-P_1}, \ldots, X_{P_1-1}=A_{Q-1}$, for the cyclic prefix of the first part, $X_{P_1}=A_0, X_{P_1+1}=A_1, \ldots, X_{P_1+Q-1}=A_{Q-1}$, for the data/RS symbols of the first part, $$X_{P_1+Q} = A_0, \ldots, X_{\frac{M}{2}-1} = A_{P_2-1},$$

for the cyclic postfix of the first part, $X_{M/2}=B_{Q-P_1}, \ldots, X_{M/2+P_1-1}=B_{Q-1}$, for the cyclic prefix of the second part, $X_{P_1+M/2}=B_0, X_{P_1+M/2+1}=B_1, \ldots, X_{M-P_2-1}=B_{Q-1}$, for the data/RS symbols of the second part, $X_{M-P_2}=B_0, \ldots, X_{M-1}=B_{P_2-1}$, for the cyclic postfix of the second part.

When applying the SS-STBC pre-coder to the first block of symbols $X=(X_0, \ldots X_{M-1})$, the second block of symbols $Y=(Y_0, \ldots Y_{M-1})$ is obtained. This second block of symbols can be defined relatively to the first block of symbols previously defined by:

$Y_0=\tilde{B}_{Q-P_1}, \ldots, Y_{P_1-1}=\tilde{B}_{Q-1}$, for the cyclic prefix of the first part, $Y_{P_1}=\tilde{B}_0, Y_{P_1+1}=\tilde{B}_1, \ldots, Y_{P_1+Q-1}=\tilde{B}_{Q-1}$, for the data/RS symbols of the first part, $$Y_{P_1+Q} = \tilde{B}_0, \ldots, Y_{\frac{M}{2}-1} = \tilde{B}_{P_2-1},$$

for the cyclic postfix of the first part, $Y_{M/2}=-\tilde{A}_{Q-P_1}, \ldots, Y_{M/2+P_1-1}=-\tilde{A}_{Q-1}$, for the cyclic prefix of the second part, $Y_{P_1+M/2}=-\tilde{A}_0, Y_{P_1+M/2+1}=-\tilde{A}_2, \ldots, Y_{M-P_2-1}=-\tilde{A}_{Q-1}$, for the data/RS symbols of the second part, $Y_{M-P_2}=-\tilde{A}_p, \ldots, Y_{M-1}=-\tilde{A}_{P_2-1}$, for the cyclic postfix of the second part.

With $\tilde{A}_n=A^*_{mod(-n,Q)}$ and $\tilde{B}_n=B^*_{mod(-n,Q)}$ and $X^*$ is the complex conjugate of X.

The scheme described above is well described in the document (X. Luo, P. Gaal, X. Zhang, and J. Montojo, "Transmit Diversity Scheme over Single SC-FDM Symbol for LTE-Advanced" in Proceedings of IEEE GLOBECOM'09, Honolulu, Hi., 2009) and in document U.S. 61/099,375.

Therefore Y can be defined based on X by:

$$Y_k = \begin{cases} \varepsilon X^*_{\frac{M}{2}+2P_1+Q-k}, & \text{for } k \in \left[P_1; \frac{M}{2}-P_2\right[ \\ -\varepsilon X^*_{\frac{M}{2}+2P_1+Q-k}, & \text{for } k \in \left[\frac{M}{2}+P_1; M-P_2\right[ \end{cases}$$

Where ε is either 1 or −1. The equations here-above were described so far with a value of ε set to 1, but it is straightforward that the same technical effect would be obtained when setting ε to −1.

It is known that for a localized subcarrier mapping, the signal in the time domain at the IDFT output has exact copies of input time symbols $X_n$ (with a scaling factor) in the M-multiple sample positions $\tilde{x}^{Tx1}_{M.n}$, and in-between values are sum of all the time input symbols in the input block with different complex-weighting, when N is a multiple of M. Signal $\tilde{x}^{Tx1}$ is an oversampled version of the block of symbols X. If, for example, a block of symbols $X^{(n)}=(0, \ldots, 0, X_n, 0, \ldots, 0)$ with $X_n$ non-null is presented to the input of a SC-FDMA modulator, that is to the input of the M-size DFT, among the samples in the radio signal $\tilde{x}^{Tx1}$ corresponding to symbol $X_n$, only a part will be of high energy, around sample $\tilde{x}^{Tx1}_{M.n}$. It is also known that, for a completely distributed subcarrier mapping, when N is a multiple of M signal $\tilde{x}^{Tx1}$ is a repetition N/M times of the block of symbols X and therefore if a block of symbols $X^{(n)}=(0, \ldots, 0, X_n, 0, \ldots, 0)$ with $X_n$ non-null is presented to the input of a SC-FDMA modulator, among the samples in the radio signal $\tilde{x}^{Tx1}$ corresponding to symbol $X_n$, only a part will be of high energy around samples $\tilde{x}^{Tx1}_{k.n}$ with k equal to 1 to N/M. For other subcarrier mapping types and/or non-integer N/M ratios similar relationships between the pre-DFT symbol $X_n$ and corresponding samples in the radio signal (among which only a fraction have high energy if a block of symbols $X^{(n)}=(0, \ldots, 0, X_n, 0, \ldots, 0)$ is presented to the input of a SC-FDMA modulator) can be established. Therefore, for each position n, the high energy samples in the time-domain signal $\tilde{x}^{Tx1}$ corresponding to symbol $X_n$ can be identified, the positions of the high energy samples in the time-domain signal being dependent on the position n, for a given subcarrier mapping and given values M and N. Such high energy samples are thus in the radio signal in time periods dependent on the position n of symbol $X_n$. Within the current state of the art, the time periods can be identified based on the exact subcarrier allocation and of the N/M ratio for a SC-FDMA symbol. For each position n of symbol $X_n$ within the block of symbols, said time periods only depend on the exact subcarrier allocation and on the N/M ratio and do not depend on the value assigned to symbol $X_n$. The same can be said of $\tilde{x}^{Tx2}$ and the block of symbols Y.

By high energy samples corresponding to symbol $X_n$ in signal $\tilde{x}^{Tx1}$ (or in the SC-FDMA symbol corresponding to the first transmit antenna) we understand those samples $\tilde{x}^{Tx1}_k$ for which the values $abs(\tilde{x}^{Tx1}_k/X_n)$ are superior to a given threshold conveniently chosen when a block of symbols $X^{(n)}=(0, \ldots, 0, X_n, 0, \ldots, 0)$ with a non-null value assigned to $X_n$ is presented to the input of a SC-FDMA modulator whose output is signal $\tilde{x}^{Tx1}=(\tilde{x}^{Tx1}_0, \ldots, \tilde{x}^{Tx1}_{N-1})$.

By high energy samples corresponding to symbol $Y_n$ in signal $\tilde{x}^{Tx2}$ (or in the SC-FDMA symbol corresponding to the second transmit antenna) we understand those samples $\tilde{x}^{Tx2}_k$ for which the values $abs(\tilde{x}^{Tx2}_k/Y_n)$ are superior to a given threshold conveniently chosen when a block of symbols $Y^{(n)}=(0, \ldots, 0, Y_n, 0, \ldots, 0)$ with a non-null value assigned to $Y_n$ is presented to the input of a SC-FDMA modulator whose output is signal $\tilde{x}^{Tx2}=(\tilde{x}^{Tx2}_0, \ldots, \tilde{x}^{Tx2}_{N-1})$.

By high energy samples corresponding to symbol $X_n$ in signal $\tilde{x}^{Tx2}$ (or in the SC-FDMA symbol corresponding to the second transmit antenna) we understand the samples $\tilde{x}^{Tx2}_k$ for which the values $abs(\tilde{x}^{Tx2}_k/X_n)$ are superior to a given threshold conveniently chosen when a block of symbols $X^{(n)}=(0, \ldots, 0, X_n, 0, \ldots, 0)$ with a non-null value assigned to $X_n$ is presented to the input of the SS-STBC pre-coder of the SS-STBC system which outputs the signal $\tilde{x}^{Tx2}=(\tilde{x}^{Tx2}_0, \ldots, \tilde{x}^{Tx2}_{N-1})$.

Equivalently, high energy samples corresponding to symbol $X_n$ are the sample(s) corresponding to symbol $X_n$ which may be efficiently processed to retrieve the information related to symbol $X_n$. Thus, the high energy sample or at least the high energy samples corresponding to symbol $X_n$ are the samples that have, relatively to the other samples (referred to as low energy samples or samples containing residual information) corresponding to symbol $X_n$, the most important contribution to the correct estimation of symbol $X_n$.

Since only high energy samples have interest in the case of the present invention (the samples containing residual information are considered as interference) we refer to them indifferently as high energy samples or as samples.

In such a SS-STBC system, at the receiver side (FIG. 3) after going through a guard removal or CP removal the symbols received go through N-sized DFT modules before demapping the M out of N occupied subcarriers. Then frequency domain equalization and SS-STBC decoder are performed (for example MMSE, minimum mean square error) in the frequency domain before retrieving the modulation symbols.

In millimeter-Wave systems, which is the case of the new radio standard or 5G currently at normalization, operations performed at high carrier frequency level are subject to strong/fast phase variations due to different causes such as phase noise, carrier frequency offset, Doppler effects, etc. This makes the tracking of the channel state difficult, especially when reference signals (RS) are set in blocks, that is, in blocks of symbols dedicated to reference signals therefore occupying one whole SS-STBC symbol, since a strong variation phase can occur between two successive transmissions of RS transmitted in dedicated SS-STBC symbols.

On the other side, inserting RS occupying less than one whole SS-STBC symbol, to track more efficiently any corruption of the signal—for example the phase variations or rapid channel changes—requires to insert the RS with the data modulation symbols in the block presented at the DFT input, to allow conserving the low PAPR of SS-STBC waveform. Nonetheless, contrary to the case where reference signals are set in dedicated blocks, when inserting reference signal multiplexed with the data modulation symbols at the DFT input, at the receiver side the reference signal may only be extracted after the SS-STBC decoder 3.7 in FIG. 3. Therefore, the extraction is done once the different modules of the SS-STBC receiving scheme have been applied, that is, these modules may be applied on corrupted symbols without any compensation. Thus the performance of such a receiver, and especially the SS-STBC decoder, can be strongly degraded when the symbols are strongly corrupted.

SUMMARY OF INVENTION

The present invention aims at improving the situation.

To that end, the invention relates to a method for insetting K quadruplets of a first, a second, a third and a fourth Reference Signals in a radio signal to be transmitted over a wireless communication system, said radio signal being emitted by an emitter comprising at least two transmit antennas, each antenna being configured for transmitting on at least an even number M, strictly greater than 1, of different frequencies, and K being a strictly positive integer smaller than or equal to M/2, said radio signal being provided by:

applying to a first block of M symbols X=(X₀, ... X_{M−1}) a precoder to obtain a second block of M symbols Y=(Y₀, ... Y_{M−1}), with $$Y_k = \begin{cases} \varepsilon X^*_{\frac{M}{2}+P_1+mod(-k+P_1+p-1,Q)}, & \text{for } k \in [\![P_1; \frac{M}{2}-P_2[\![ \\ -\varepsilon X^*_{P_1+mod(-k+P_1+\frac{M}{2}+p-1,Q)}, & \text{for } k \in [\![\frac{M}{2}+P_1; M-P_2[\![ \end{cases},$$

with $P_1$ and $P_2$ predefined positive or equal to zero integers, such as $P_1+P_2$ is strictly, smaller than M/2, p a predefined integer and ε is 1 or −1 and $X_k^*$ being the complex conjugate of $X_k$;

applying at least a M size DFT then a N size IDFT corresponding to a first transmit antenna, to the first block of M symbols to obtain a first single-carrier frequency division multiple access, SC-FDMA, symbol representing the first block of M symbols, said first SC-FDMA symbol being of a given duration;

applying at least a M size DFT then a N size IDFT corresponding to a second transmit antenna, to the second block of M symbols to obtain a second single-carrier frequency division multiple access, SC-FDMA, symbol representing the second block of M symbols, said second SC-FDMA symbol being of the given duration;

transmitting during a time interval of the given duration, respectively on the first and second transmit antennas, simultaneously the first and second SC-FDMA symbols, into the radio signal;

said method comprising:

determining a number L smaller than or equal to min(M/2−P₁−P₂; K) of integers such as $$\{n_i \mid i \in [\![1; L]\!], P_1 \le n_i < \frac{M}{2} - P_2, \forall i, j \in [\![1; L]\!]^2, i < j \Rightarrow n_i < n_j\};$$

and for each i-th quadruplet out_of L quadruplets of a first, a second, a third and a fourth Reference Signals among the K quadruplets:

inserting the first Reference Signal such as samples of the first Reference Signal are in positions in the first SC-FDSA symbols dependent on a position $n_i$ of the symbol $X_{n_i}$ in the first block of M symbols;

inserting the second Reference Signal such as samples of the second Reference Signal are in positions in the first SC-FDSA symbols dependent on the position $$\frac{M}{2} + P_1 + mod(-n_i + P_1 + p - 1, Q)$$

of the symbol $$X_{(\frac{M}{2}+P_1+mod(-n_i+P_1+p-1,Q))}$$

in the first block of M symbols;

inserting the third Reference Signal such as samples of the third Reference Signal are in positions in the second SC-FDMA symbols dependent on a position $n_i$ of the symbol $X_{n_i}$ in the first block of M symbols;

inserting the fourth Reference Signal such as samples of the fourth Reference Signal are in positions in the second SC-FDMA symbols dependent on the position $$\frac{M}{2} + P_1 + mod(-n_i + P_1 + p - 1, Q)$$

of the symbol $$X_{(\frac{M}{2}+P_1+mod(-n_i+P_1+p-1,Q))}$$

in the first block of M symbols.

According to the invention the high energy samples of the first Reference Signal are emitted from one transmit antenna (first transmit antenna) in the same time periods as the high energy samples of the fourth Reference Signal, which are emitted from the other transmit antenna (second transmit antenna). In addition, the high energy samples of the second Reference Signal are emitted from the first transmit antenna in the same time periods as the high energy samples of the third Reference Signal, which are emitted from the second transmit antenna.

Time periods including the high energy samples of the pair of first and second Reference Signals for the first transmit antenna are the same as the time periods including the high energy samples of the pair of third and fourth Reference Signals for the second transmit antenna. Therefore, in those time periods, information relative to the first, second, third and fourth Reference Signals are emitted from the two transmit antennas emitting the SC-FDMA symbols, and no information (or only residual information) relative to non-reference signals are emitted in said time periods. That is, reference signals are time domain superposed in time periods at the emitter side, and consequently information relative to reference signals is received in corresponding time periods at the receiver side. Such insertion of samples of the reference signals in the radio signal, provided by the specific scheme (SS-STBC-like scheme) applied on the first block of symbols, enables to separate at the receiver side the information relative to samples of the reference signal from the information relative to samples of other modulation symbols. Therefore, the invention enables a receiver to extract parts of the signal containing the information relative to the transmitted reference signals samples, in the time domain, without extracting parts of the signal containing information relative to samples of non-reference signals, or at the most extracting only parts of the signal containing residual information relative to the samples of non-reference signals.

Indeed, if the high energy samples of reference signals and non-reference signals were emitted from different transmit antennas in the same time periods, they would appear time-domain superposed at the receiver side in the corresponding time period. This would require to apply the full receiving scheme before being able to separate information relative to reference signals from information relative to non-reference signals at the receiver side.

The SS-STBC scheme which provides the radio signal, according to the invention, for example a SS-STBC, is a linear scheme, that is the radio signal issued from applying the SS-STBC scheme on block symbols X=(X₀, ... X_{M−1}), is equal to the radio signal which is the sum of signals onto each transmit antenna (the sum is realized just after applying the IDFT) respectively issued from applying the scheme on first blocks of symbols $X_1=(X_0, 0, \ldots, 0), \ldots X^{(n)}=(0, \ldots, 0, X_n, 0, \ldots, 0), \ldots X^{(M-1)}=(0, \ldots, 0, X_{M-1})$. The radio signal issued from applying the scheme on the first block of symbols $X^{(n)}=(0, \ldots, 0, X_n, 0, \ldots, 0)$ is referred to as the samples in the radio signal corresponding to symbol $X_n$. The high energy samples of each such post-IDFT signal issued from applying the scheme on the first block of symbols $X^{(n)}=(0, \ldots, 0, X_n, 0, \ldots, 0)$ are in time periods dependent on the position n of symbol $X^{(n)}$ within the first block of symbols.

In other words, the first and second SC-FDMA symbols, issued from applying the SS-STBC scheme on block symbols $X=(X_0, \ldots X_{M-1})$, is equal to the first and second SC-FDMA symbols, which are the sum (at the output of the IDFTs) of the SC-FDMA symbols issued on each antenna from applying the SS-STBC scheme respectively on the first blocks of symbols $X^{(0)}=(X_0, 0, \ldots, 0), \ldots X^{(n)}=(0, \ldots, 0, X_n, 0, \ldots, 0), \ldots$ and $X^{(M-1)}=(0, \ldots, 0, X_{M-1})$.

The first and second SC-FDMA symbols signal issued from applying the SS-STBC scheme on the first block of symbols $X^{(n)}=(0, \ldots, 0, X_n, 0, \ldots, 0)$ is referred to as the samples in the SC-FDMA symbols corresponding to symbol $X_n$. The high energy samples of these samples in the SC-FDMA symbols corresponding to symbol $X_n$ are in time periods dependent on the position n of symbol $X_n$ within the first block of symbols.

For the sake of simplicity, in the following samples in the radio signal and samples in the SC-FDMA symbols are synonymous.

In the radio signal, the samples corresponding to different symbols $X_n$ may overlap in the time domain (at least with the samples containing residual information), each set of such samples contributes to the radio signal.

By samples in the radio signal, or in the SC-FDMA symbols, corresponding to symbol $X_n$ (or simply samples of the corresponding symbol $X_n$) it is understood that there exists a value $\sigma_n$ such as the samples in the radio signal, or in the SC-FDMA symbols, can be obtained by applying the specific scheme (SS-STBC scheme) to the block $X^{(n)}$, with the value of $X_n$ set to $\sigma_n$ This only defines the samples corresponding to symbol $X_n$ in the radio signal but does not limit the way such samples can be obtained. The symbol $X_n$ is referred to as the corresponding symbol of the samples, such value $\sigma_n$ is referred to as a corresponding value of the samples (or simply the corresponding value).

The samples in the radio signal corresponding to symbol $X_n$ can be inserted in the radio signal in different ways. For example, the value of the symbol $X_n$ is set to a corresponding value $\sigma_n$ and the specific scheme is applied to the first block of symbols containing the corresponding value in position n. In another example, the value of the corresponding symbol $X_n$ is set to 0 in the first block of symbols, and the samples corresponding to symbol $X_n$, whose value is set to the corresponding value $\sigma_n$ are added at the output of the IDFT. In yet another example, desired samples in the radio signal corresponding to symbol $X_n$ can be obtained through frequency domain processing. In another example, the desired value is added in the second block of symbols.

As mentioned above the samples in the radio signal corresponding to symbol $X_n$ can be obtained in different ways, thus the corresponding value $\sigma_n$ can be theoretical. That is, there is no such symbol of value $\sigma_n$ in the block of symbol on which is applied the specific scheme, but instead the samples can be added to the output of the IDFT to obtain the SC-FDMA symbols instead of processing the corresponding symbol $X_n$. The invention encompasses the embodiments where the insertion of the reference signals is done in the time domain, that is pre-DFT or post-IDFT, but also where the insertion of reference signals is done in the frequency domain, that is after applying a DFT but before applying the IDFT.

High energy samples (in the radio signal or in the SC-FDMA symbols) corresponding to symbol $X_n$ are emitted during specific time periods. The time periods of emission of these high energy samples are dependent on the position n of the corresponding symbol in the first block of symbols. The time periods of emissions can be different on different antennas for the emission of the high energy samples in the radio signal corresponding to a given symbol $X_n$.

Thus by time periods dependent on the position n we relate to the time periods during which the high energy samples in the radio signal corresponding to symbol $X_n$, at the position n in the first block of symbols, are emitted relatively to the beginning of the emission of the bloc of symbol.

Time period(s) dependent on the position n will be considered as the same as time period(s) corresponding to one of the positions in SC-FDMA symbol dependent on the position n even though the emitted radio signal and the signals at the output of the N-size IDFT may have a minor time offset.

Positions in a SC-FDMA symbol dependent on a position n of the symbol $X_n$, or simply dependent on n, refers to the time periods in the SC-FDMA symbol during which the samples (more specifically the samples of high energy) in the SC-FDMA symbol corresponding to the symbol $X_n$ are emitted.

Therefore, the time periods dependent on the position $$\frac{M}{2} + P_1 + \mod(-n + P_1 + p - 1, Q)$$

of the symbol $$X_{\left(\frac{M}{2}+P_1+mod(-n+P_1+p-1,Q)\right)}$$

in the first block of symbols are the same as the time periods dependent on the position n of the symbol $X_n$. During these time periods, emission of high energy samples in the radio signal corresponding to symbols $X_n$ and respectively $$X_{\left(\frac{M}{2}+P_1+mod(-n+P_1+p-1,Q)\right)}$$

occur from different transmit antennas but in the same time periods.

When $$Y_k = \begin{cases} \varepsilon X^*_{\frac{M}{2}+P_1+mod(P_1-k+p-1,Q)}, & \text{for } k \in [\![P_1; \frac{M}{2}-P_2[\![ \\ -\varepsilon X^*_{P_1+mod(\frac{M}{2}+P_1-k+p-1,Q)}, & \text{for } k \in [\![\frac{M}{2}+P_1; M-P_2[\![ \end{cases}$$

the following stands:

Samples emitted from the first transmit antenna corresponding to symbol $X_n$ are in the same time periods (dependent on the position n of the symbol $X_n$ in the first block of symbols) than the samples emitted from the second transmit antenna corresponding to symbol $$X_{\left(\frac{M}{2}+P_1+\text{mod}(-n+P_1+p-1,Q)\right)}$$

dependent on the position $$\frac{M}{2} + P_1 + \text{mod}(-n + P_1 + p - 1, Q)$$

of the symbol $$X_{\left(\frac{M}{2}+P_1+\text{mod}(-n+P_1+p-1,Q)\right)}$$

in the first block of symbols);

Samples emitted from the second transmit antenna corresponding to symbol $X_n$ are in the same time periods (dependent on the position n of the symbol $X_n$ in the first block of symbols) than the samples emitted from the first transmit antenna corresponding to symbol $$X_{\left(\frac{M}{2}+P_1+\text{mod}(-n+P_1+p-1,Q)\right)}$$

dependent on the position $$\frac{M}{2} + P_1 + \text{mod}(-n + P_1 + p - 1, Q)$$

of the symbol $$X_{\left(\frac{M}{2}+P_1+\text{mod}(-n+P_1+p-1,Q)\right)}$$

in the first block of symbols).

By time interval it is understood the time duration during which the samples corresponding to all the symbols $X_n$ with n=0 to M−1 are emitted which is equal to the duration of a SC-FDMA symbol.

By reference signals the invention encompasses all corresponding symbols that are known by the receiver regarding their values and their positions, and on the basis of which the receiver can estimate the impact of the channel between the transmitter and the receiver. For example, based on the received version of the reference signals (e.g. corrupted by channel and/or noise and/or phase noise, etc), the receiver can estimate the channel and/or improve the channel estimation quality. Note that the channel encompasses here all effects including propagation and hardware impact such as nonlinearities, phase noise, Doppler, carrier frequency offset etc.

The M−2K symbols in the block of symbols X=($X_0$, . . . $X_{M-1}$) that are not reference signals may result from any other type of data such as control data other than reference signal or user data.

M is strictly greater than 1, advantageously M is strictly greater than 3 which enables to have M−2K different from zero and transmit data other than the K quadruplets of reference signals.

L is smaller than or equal to K. In case cycle prefix and cycle postfix are added as described in the followings, then L is smaller than or equal to min(M/2−$P_1$−$P_2$; K) and advantageously smaller than or equal to min(M/2−$P_1$−$P_2$−1; K) when data other than the K quadruplets of reference signals is transmitted.

The transmit antennas are configured for transmitting on M frequencies, that is that the signal emitted by such transmitting antennas is provided by applying an N-size IDFT on M complex symbols, one complex symbol for each of the M allocated subcarriers. Previous to the IDFT, the M subcarriers may be mapped with a subcarrier mapping module on a greater number of N subcarriers. N−M of these subcarriers are not allocated subcarriers since they are set to zero, the M other subcarriers are M allocated subcarriers, on which the M complex symbols are mapped. In this case the IDFT module is of size N.

The radio signal is understood as the signal provided by all the transmit antennas together.

In the case of the invention the pre-coder applied to the first block of M symbols is not the SS-STBC pre-coder of the prior art but a modified SS-STBC pre-coder which is defined by:

$$Y_k = \begin{cases} \varepsilon X^*_{\frac{M}{2}+P_1+\text{mod}(-k+P_1+p-1,Q)}, & \text{for } k \in \left[P_1; \frac{M}{2} - P_2\right[ \\ -\varepsilon X^*_{P_1+\text{mod}(-k+P_1+\frac{M}{2}+p-1,Q)}, & \text{for } k \in \left[\frac{M}{2} + P_1; M - P_2\right[ \end{cases}$$

With p a predefined integer.

With ε the predefined value 1 or −1. When not stated otherwise, in the following we consider ε=1. Indeed, changing the sign (+/−) of the signal related to the second antenna does not change the method.

Therefore, the first block of symbols X=($X_0$, . . . $X_{M-1}$) can be defined by:
$X_0=A_{Q-P_1}$, . . . , $X_{P_1-1}=A_{Q-1}$, for the cyclic prefix of the first part,
$X_{P_1}=A_0$, $X_{P_1+1}=A_1$, . . . , $X_{P_1+Q-1}=A_{Q-1}$, for the data/RS symbols of the first part, $$X_{P_1+Q} = A_0, \ldots, X_{\frac{M}{2}-1} = A_{P_2-1},$$

for the cyclic postfix of the first part,
$X_{M/2}=B_{Q-P_1}$, . . . , $X_{M/2+P_1-1}=B_{Q-1}$, for the cyclic prefix of the second part,
$X_{P_1+M/2}=B_0$, $X_{P_1+M/2+1}=B_1$, . . . , $X_{M-P_2-1}=B_{Q-1}$, for the data/RS symbols of the second part,
$X_{M-P_2}=B_0$, . . . , $X_{M-1}=B_{P_2-1}$, for the cyclic postfix of the second part.

When applying the modified SS-STBC pre-coder to the first block of symbols X=($X_0$, . . . $X_{M-1}$), the second block of symbols Y=($Y_0$, . . . $Y_{M-1}$) is obtained. This second block of symbols can be defined relatively to the first block of symbols previously defined by:
$Y_0=\tilde{B}_{Q-P_1}$, . . . , $Y_{P_1-1}=\tilde{B}_{Q-1}$, for the cyclic prefix of the first part,
$Y_{P_1}=\tilde{B}_0$, $Y_{P_1+1}=\tilde{B}_1$, . . . , $Y_{P_1+Q-1}=\tilde{B}_{Q-1}$, for the data/RS symbols of the first part, $$Y_{P_1+Q} = \tilde{B}_0, \ldots, Y_{\frac{M}{2}-1} = \tilde{B}_{P_2-1},$$

for the cyclic postfix of the first part,
$Y_{M/2} = -\tilde{A}_{Q-P_1}, \ldots, Y_{M/2+P_1-1} = -\tilde{A}_{Q-1}$, for the cyclic prefix of the second part,
$Y_{P_1+M/2} = -\tilde{A}_0, Y_{P_1+M/2+1} = -\tilde{A}_2, \ldots, Y_{M-P_2-1} = -\tilde{A}_{Q-1}$, for the data/RS symbols of the second part,
$Y_{M-P_2} = -\tilde{A}_0, \ldots, Y_{M-1} = -\tilde{A}_{P_2-1}$, for the cyclic postfix of the second part.

With $\tilde{A}_n = A^*_{mod(-n+p-1,Q)}$ and $\tilde{B}_n = B^*_{mod(-n+p-1,Q)}$ and $X^*$ is the complex conjugate of $X$.

By mod(A, B) it is understood A modulo B which is the remainder of the Euclidean division of A by B. Formally mod(A, B) can be written A−E[A/B]*B.

K and/or L may be chosen higher than a predefined threshold, to ensure that the phase tracking and/or channel estimation is efficient and/or enables to compute a reliable channel estimate.

K and/or L may be chosen lower than a predefined threshold, to reduce the number of reference signals being transmitted, thus enabling to transmit more data and increase the throughput.

According to an aspect of the invention, for each quadruplet i among the L quadruplets, inserting the first, second, third and fourth Reference Signals is done by setting values of symbol $X_{n_i}$ and symbol $$X_{(\frac{M}{2}+P_1+mod(-n_i+P_1+p-1,Q))}$$

to respectively values representing the first and second Reference Signals of quadruplet i, before applying the precoder and the M size DFT corresponding to the first transmit antenna to the first block.

In this embodiment, referred as pre-DFT insertion, the reference signals are inserted at a pre-DFT level, in the block of symbols. The values of the symbols $X_{n_i}$ and $$X_{(\frac{M}{2}+P_1+mod(-n_i+P_1+p-1,Q))}$$

are therefore set at values known by the receiver. Such an implementation can easily be adapted in any standard emitter and therefore can be implemented in all transmitters. Moreover, there is no need of additional operations such as post-IDFT processing or memory storage of the samples of the reference signals.

Values representing reference signals are the corresponding values of the samples of the reference signals which are known by the receiver. These values, to which the symbols $X_{n_i}$ and $$X_{(\frac{M}{2}+P_1+mod(-n_i+P_1+p-1,Q))}$$

are set to, can be for examples values of symbols of a digital modulation scheme, or values taken from a CAZAC sequence as mentioned below.

According to an aspect of the invention, for each quadruplet i, said method further comprises:
setting the values of the symbol $X_n$, and of the symbol $$X_{(\frac{M}{2}+P_1+mod(-n_i+P_1+p-1,Q))}$$

to 0, with $i \in [\![1;L]\!]$, before applying the precoder to the first block;

inserting the first, second, third and fourth Reference Signals is done by:

setting values of symbol $X_{n_i}$ and symbol $$X_{(\frac{M}{2}+P_1+mod(-n_i+P_1+p-1,Q))}$$

to respectively values representing the first and second Reference Signals of quadruplet i, after applying the precoder to the first block and before applying the M size DFT corresponding to the first transmit antenna to the first block;

setting values of symbol $Y_{n_i}$ and symbol $$Y_{(\frac{M}{2}+P_1+mod(-n_i+P_1+p-1,Q))}$$

to respectively values representing fourth and third Reference Signals of quadruplet i, before applying the M size DFT corresponding to the second transmit antenna to the second block.

By samples in the first SC-FDMA symbol corresponding to post pre-coding symbol $X_n$ (or simply samples of the corresponding post pre-coding symbol $X_n$) it is understood that there exists a value $\rho_n$ such as these samples in the first SC-FDMA symbol, can be obtained by applying the SC-FDMA scheme (DFT-Subcarrier mapping-IDFT) to the block $X^{(n)}$, with the value of $X_n$ set to $\rho_n$. This only defines the samples corresponding to post pre-coding symbol $X_n$ in the first SC-FDMA symbol contrary to the samples corresponding to the symbol $X_n$ which defines both the samples in the first and second SC-FDMA symbols. The symbol $X_n$ is referred to as the corresponding post pre-coding symbol of the samples, such value $\rho_n$ is referred to as a corresponding post pre-coding value of the samples (or simply the corresponding post pre-coding value).

By samples in the second SC-FDMA symbol corresponding to post pre-coding symbol $Y_n$ (or simply samples of the corresponding post pre-coding symbol $Y_n$) it is understood that there exists a value $\rho'_n$ such as these samples in the second SC-FDMA symbol, can be obtained by applying the SC-FDMA scheme (DFT-Subcarrier mapping-IDFT) to the block $Y^{(n)}$, with the value of $Y_n$ set to $\rho'_n$. This only defines the samples corresponding to post pre-coding symbol $Y_n$ in the second SC-FDMA symbol but does not limit the way such samples can be obtained. The symbol $Y_n$ is referred to as the corresponding post pre-coding symbol of the samples, such value $\rho'_n$ is referred to as a corresponding post pre-coding value of the samples (or simply the corresponding post pre-coding value).

In this embodiment, referred as post pre-coding insertion, the reference signals are inserted after the pre-coding is applied. This enables to process only the non-reference signal symbols through the SS-STBC pre-coder. Therefore, reference signal symbols and non-reference signal symbols can be processed in different manners. This enables for example to process the reference signals in the second block of symbols once and for all.

According to an aspect of the invention, for each quadruplet i, said method further comprises:

setting the values of the symbol $X_{n_i}$ and of the symbol $$X_{(\frac{M}{2}+P_1+mod(-n_i+P_1+p-1,Q))}$$

to 0, with $i \in [\![1;L]\!]$, before applying the precoder and the M size DFT to the first block;

inserting the first, second, third and fourth Reference Signals is done by:
  adding samples of the first Reference Signal and samples of the second Reference Signal to the output signal of the N size IDFT corresponding to the first transmit antenna, to obtain the first SC-FDMA symbol;
  adding samples of the third Reference Signal and samples of the fourth Reference Signal to the output signal of the N size IDFT corresponding to the second transmit antenna, to obtain the second SC-FDMA symbol.

In this embodiment, referred to as post IDFT insertion, the reference signals are inserted after applying the IDFTs. This enables to process only the non-reference signal symbols through the specific scheme applied, according to the invention, to the block of symbols. Therefore, reference signal symbols and non-reference signal symbols can be processed in different manners. This enables for example to process the samples of the reference signals once and for all. This enables for example to control the interference of the samples of the reference signals onto the samples of non-reference signals by specific processing applied onto the samples of the reference signals.

The samples of the reference signals may be previously computed to obtain samples identical or at least equivalent (that is identical in regard of the high power samples) to those that would have been obtained by pre-DFT insertion or post pre-coding insertion (also referred as pre-DFT independent insertion) in the first and second block of symbols of the reference signals. That is, in the case of pre-DFT insertion, for each $i \in [\![1;L]\!]$, by obtaining samples of the first and second reference signal in the first SC-FDMA symbol and samples of third and fourth reference signal in the second SC-FDMA symbol by setting the values of the symbols $X_{n_i}$ ($\sigma_{n_i}$) and $$X_{(\frac{M}{2}+P_1+mod(-n_i+P_1+p-1,Q))}$$

$$\left(\sigma_{(\frac{M}{2}+P_1+mod(-n_i+P_1+p-1,Q))}\right),$$

to values known by the receiver and setting the rest of the values in the block of symbols X to zero. That is, in the case of post pre-coding insertion, for each $i \in [\![1;L]\!]$, by obtaining samples of the first and second reference signal in the first SC-FDMA symbol by setting the values of the symbols $X_{n_i}$ and $$X_{(\frac{M}{2}+P_1+mod(-n_i+P_1+p-1,Q))}$$

after having applied the pre-coder and before applying the DFT, to values known by the receiver ($\rho_{n_i}$ and $$\rho_{(\frac{M}{2}+P_1+mod(-n_i+P_1+p-1,Q))}$$

respectively) and by obtaining samples of the third and fourth reference signal in the second SC-FDMA symbol by setting the values of the symbols $$Y_{(\frac{M}{2}+P_1+mod(-n_i+P_1+p-1,Q))}$$

and $Y_{n_i}$, to values known by the receiver $$\left(\rho'_{(\frac{M}{2}+P_1+mod(-n_i+P_1+p-1,Q))}\right.$$

and $\rho'_{n_i}$ respectively). In this case samples of the reference signals are inserted to obtain the same or equivalent radio signal as if they were inserted pre-DFT or post pre-coding.

It is also possible to insert the reference signals in the frequency domain that is after applying the M-size DFTs but before applying the N-size IDFTs.

According to an aspect of the invention, the method further comprises setting the output signal of the N size IDFT corresponding to the first transmit antenna to 0 at least during a time period corresponding to one of the positions in the first SC-FDMA symbol dependent on the position $n_i$ of the symbol $X_{n_i}$ and/or the position $$\frac{M}{2} + P_1 + \text{mod}(-n_i + P_1 + p - 1, Q)$$

of the symbol $$X_{(\frac{M}{2}+P_1+mod(-n_i+P_1+p-1,Q))}$$

in the first block of symbols; and/or setting the output signal of the N size IDFT corresponding to the second transmit antenna to 0 at least during a time period corresponding to one of the positions in the second SC-FDMA symbol dependent on the position $n_i$ of the symbol $X_{n_i}$ and/or the position $$\frac{M}{2} + P_1 + \text{mod}(-n_i + P_1 + p - 1, Q)$$

of the symbol $$X_{(\frac{M}{2}+P_1+mod(-n_i+P_1+p-1,Q))}$$

in the first block of symbols, for at least one $i \in [\![1;L]\!]$ before inserting the first, second, third and fourth Reference Signals of quadruplet i.

When applying the specific scheme to the block of symbols, with values of the symbols $X_{n_i}$ and the symbols $$X_{\left(\frac{M}{2}+P_1+mod(-n_i+P_1+p-1,Q)\right)}$$

set to 0, at least for one quadruplet i among the L quadruplets, interference from the symbols $X_n$ with n different from $n_i$ and $$\frac{M}{2}+P_1+\mathrm{mod}(-n_i+P_1+p-1,Q)$$

may occur in time periods in which are inserted the samples of the reference signal of the quadruplet i, that is in the time periods dependent in the positions $n_i$ and $$\frac{M}{2}+P_1+\mathrm{mod}(-n_i+P_1+p-1,Q),$$

with said $i \in [\![1;L]\!]$. Therefore, the output signals of the N size IDFTs are set to zero during those time periods, thus, the interference is decreased.

According to an aspect of the invention, the method further comprises determining:
a number H of pairs of positive integers $k_l$ and $k'_l$ with $l \in [\![1;H]\!]$, with H strictly greater than 1, such as:

$$k_1=1, k'_H=L,$$

$$\forall l \in [\![1;H-1]\!], k_l<k'_l<k_{l+1}<k'_{l+1},$$

a positive integer d strictly greater than 1;
the L integers $n_i$, with $i \in [\![1;L]\!]$ such as:

$$\forall l \in [\![1;L-1]\!], n_{k_{l+1}}-n_{k'_l} \geq d$$

$$\forall l \in [\![1;L]\!], n_{k'_l}-n_{k_l}=k'_l-k_l.$$

This enables to set groups of contiguous reference signals, that is the corresponding symbols $$\left(X_{n_{k_l}}, X_{n_{k_l}+1}, \ldots, X_{n_{k'_l}}\right)$$

of the samples of the reference signals of the group l, are contiguous symbols in the first block of symbols, which is equivalent to $n_{k'_l}-n_{k_l}$ being equal to $k'_l-k_l$. The integer d is the minimum distance set between two groups. This enables to define 4.H groups of various sizes. Indeed, the corresponding symbols $$X_{\left(\frac{M}{2}+P_1+mod(-n_i+P_1+p-1,Q)\right)}, Y_{\left(\frac{M}{2}+P_1+mod(-n_i+P_1+p-1,Q)\right)}$$

and $Y_{n_i}$ with $i \in [\![1;L]\!]$, are also set as groups of contiguous symbols. Having contiguous groups of corresponding symbols leads to increased robustness against interference both from non-reference signal symbols and multipath propagation. The more groups are defined the more the phase variations can be precisely tracked.

According to an aspect of the invention, the method further comprises determining:
a positive integer d strictly greater than 1;
the L integers $n_i$, with $i \in [\![1;L]\!]$ such as:

$$n_{i+1}-n_i \geq d$$

This enables to set L quadruplets of distributed reference signals. The integer d is the minimum distance set between the distributed reference signals whose corresponding symbols are in positions $n_i$ and $n_{i+1}$ with $i \in [\![1;L]\!]$. The more distributed reference signals are defined the more the phase variations can be precisely tracked.

According to an aspect of the invention, $n_L-n_1=L-1$.

This enables to set all the reference signals inserted in the radio signal as at least four groups of L contiguous reference signals, reducing the interference between the samples of reference signals and the non-reference signals samples.

According to an aspect of the invention, a value $\rho_n$, such as the samples in the first SC-FDMA symbol are obtained from the symbol $X_n$ whose value is set to $\rho_n$, $\rho_n$ being:
equal to a value $\rho_{n+Q}$, such as the samples in the first SC-FDMA symbol are obtained from the symbol $X_{n+Q}$ whose value is set to $\rho_{n+Q}$, if $n \in [\![0;P_1-1]\!] \cup [\![M;M+P_1-1]\!]$;
equal to a value $\rho_{n-Q}$, such as the samples in the first SC-FDMA symbol are obtained from the symbol $X_{n-Q}$ whose value is set to $\rho_{n-Q}$, if $$n \in \left[\!\!\left[\frac{M}{2}-P_2; \frac{M}{2}-1\right]\!\!\right] \cup [\![M-P_2; M-1]\!];$$

and/or
a value $\rho'_n$, such as the samples in the second SC-FDMA symbol are obtained from the symbol $Y_n$ whose value is set to $\rho'_n$, $\rho'_n$ being:
equal to a value $\rho'_{n+Q}$, such as the samples in the second SC-FDMA symbol are obtained from the symbol $X_{n+Q}$ whose value is set to $\rho'_{n+Q}$, if $n \in [\![0;P_1-1]\!] \cup [\![M;M+P_1-1]\!]$;
equal to a value $\rho'_{n-Q}$, such as the samples in the second SC-FDMA symbol are obtained from the symbol $X_{n-Q}$ whose value is set to $\rho'_{n-Q}$, if $$n \in \left[\!\!\left[\frac{M}{2}-P_2; \frac{M}{2}-1\right]\!\!\right] \cup [\![M-P_2; M-1]\!].$$

This enables to create a cyclic prefix and cyclic postfix within the first M/2 symbols and the second M/2 symbols group in the first block of symbols. Due to the transformation applied by the pre-coder we recover the same cyclic prefix and cyclic postfix scheme in the second block of symbols.

The cyclic prefix and cyclic postfix scheme enables to avoid or at least reduce interference between the first M/2 symbols of the blocks of symbols and the last M/2 symbols of the blocks of symbols.

According to an aspect of the invention, the value $\sigma_{n_i}$, such as the samples in the first SC-FDMA symbol that are obtained from the symbol $X_{n_i}$ whose value is set to $\sigma_{n_i}$ are equal to the samples of the first reference signal of quadruplet i in the first SC-FDMA symbol, is a component of a CAZAC sequence; and/or the value $$\sigma_{\left(\frac{M}{2}+P_1+mod(-n_i+P_1+p-1,Q)\right)},$$

such as the samples in the first SC-FDMA symbol that are obtained from the symbol $$X_{\left(\frac{M}{2}+P_1+mod(-n_i+P_1+p-1,Q)\right)}$$

whose value is set to $$\sigma_{\left(\frac{M}{2}+P_1+mod(-n_i+P_1+p-1,Q)\right)}$$

are equal to the samples of the second reference signal of quadruplet i in the first SC-FDMA symbol, is a component of a CAZAC sequence According to an aspect of the invention, the value $\rho_{n_i}$, such as the samples in the first SC-FDMA symbol that are obtained from the symbol $X_{n_i}$ whose value is set to $\rho_{n_i}$ are equal to the samples of the first reference signal of quadruplet i in the first SC-FDMA symbol, is a component of a CAZAC sequence; and/or the value $$\rho_{\left(\frac{M}{2}+P_1+mod(-n_i+P_1+p-1,Q)\right)},$$

such as the samples in the first SC-FDMA symbol that are obtained from the symbol $$X_{\left(\frac{M}{2}+P_1+mod(-n_i+P_1+p-1,Q)\right)}$$

whose value is set to $$\rho_{\left(\frac{M}{2}+P_1+mod(-n_i+P_1+p-1,Q)\right)}$$

are equal to the samples of the second reference signal of quadruplet i in the first SC-FDMA symbol, is a component of a CAZAC sequence; and/or the value $$\rho'_{\left(\frac{M}{2}+P_1+mod(-n_i+P_1+p-1,Q)\right)},$$

such as the samples in the second SC-FDMA symbol that are obtained from the symbol $$Y_{\left(\frac{M}{2}+P_1+mod(-n_i+P_1+p-1,Q)\right)}$$

whose value is set to $$\rho'_{\left(\frac{M}{2}+P_1+mod(-n_i+P_1+p-1,Q)\right)}$$

are equal to the samples of the third reference signal of quadruplet i in the second SC-FDMA symbol, is a component of a CAZAC sequence; and/or the value $\rho'_{n_i}$, such as the samples in the second SC-FDMA symbol that are obtained from the symbol $Y_{n_i}$ whose value is set to $\rho'_{n_i}$ are equal to the samples of the fourth reference signal of quadruplet i in the second SC-FDMA symbol, is a component of a CAZAC sequence.

This enables to distinguish overlapping samples of two reference signals more efficiently. For example the samples corresponding to $X_{n_i}$ and the samples corresponding to $$X_{\left(\frac{M}{2}+P_1+mod(-n_i+P_1+p-1,Q)\right)}$$

are emitted in the same time periods, therefore by defining the corresponding post pre-coding values $\rho_{n_i}$, $$\rho_{\left(\frac{M}{2}+P_1+mod(-n_i+P_1+p-1,Q)\right)},$$

$\rho'_{n_i}$ and $$\rho'_{\left(\frac{M}{2}+P_1+mod(-n_i+P_1+p-1,Q)\right)}$$

as components of orthogonal CAZAC sequences it is more efficient to distinguish and process each reference signals.

In case of pre-DFT insertion, this embodiment is identical to setting the corresponding values of the symbols $X_{n_i}$, with $\{n_i | i \in [\![1;L]\!]\}$, as components of a CAZAC sequence and/or to setting the corresponding values of the symbols $$X_{\left(\frac{M}{2}+P_1+mod(-n_i+P_1+p-1,Q)\right)},$$

with $\{n_i | i \in [\![1;L]\!]\}$, as components of a CAZAC sequence.

It can be advantageous to select the second CAZAC sequence such that symbols $Y_{n_i}$, with $\{n_i | i \in [\![1;L]\!]\}$ are components of a CAZAC sequence, orthogonal to the first one.

It is advantageous to set all the corresponding post pre-coding values $\rho_{n_i}$, $$\rho_{\left(\frac{M}{2}+P_1+mod(-n_i+P_1+p-1,Q)\right)},$$

and respectively $\rho'_{n_i}$ and $$\rho'_{\left(\frac{M}{2}+P_1+mod(-n_i+P_1+p-1,Q)\right)}$$

to components of orthogonal CAZAC sequences.

According to an aspect of the invention, the CAZAC sequences is a Zadoff-Chu sequences.

Zadoff-Chu sequences are specific CAZAC sequences which are more efficient in distinguishing each reference signals.

In another example, the corresponding values $\sigma_{n_i}$ and $$\sigma_{(\frac{M}{2}+P_1+mod(-n_i+P_1+p-1,Q)}$$

are set to known modulation symbols from the digital modulation scheme used to obtain the data from the block of symbols.

In another example, the corresponding post pre-coding values $\rho_{n_i}$, $$\rho_{(\frac{M}{2}+P_1+mod(-n_i+P_1+p-1,Q)},$$

$\rho'_{n_i}$ and $$\rho'_{(\frac{M}{2}+P_1+mod(-n_i+P_1+p-1,Q)}$$

are set to known modulation symbols from the digital modulation scheme used to obtain the data from the block of symbols.

According to an aspect of the invention, the value $\rho_{n_i}$, such as the samples in the first SC-FDMA symbol that are obtained from the symbol $X_{n_i}$ whose value is set to $\rho_{n_i}$ are equal to the samples of the first reference signal of quadruplet i in the first SC-FDMA symbol, is equal to a value $\rho'_{n_i}$, such as the samples in the second SC-FDMA symbol that are obtained from the symbol $Y_{n_i}$ whose value is set to $\rho'_{n_i}$ are equal to the samples of the fourth reference signal of quadruplet i in the second SC-FDMA symbol; and/or wherein a value $$\rho_{(\frac{M}{2}+P_1+mod(-n_i+P_1+p-1,Q)},$$

such as the samples in the first SC-FDMA symbol that are obtained from the symbol $$X_{(\frac{M}{2}+P_1+mod(-n_i+P_1+p-1,Q)}$$

whose value is set to $$\rho_{(\frac{M}{2}+P_1+mod(-n_i+P_1+p-1,Q)}$$

are equal to the samples of the second reference signal of quadruplet i in the first SC-FDMA symbol, is equal to a value $$\rho'_{(\frac{M}{2}+P_1+mod(-n_i+P_1+p-1,Q)},$$

such as the samples in the second SC-FDMA symbol that are obtained from the symbol $$Y_{(\frac{M}{2}+P_1+mod(-n_i+P_1+p-1,Q)}$$

whose value is set to $$\rho'_{(\frac{M}{2}+P_1+mod(-n_i+P_1+p-1,Q)}$$

are equal to the samples of the third reference signal of quadruplet i in the second SC-FDMA symbol.

That is the corresponding post-precoding values $\rho_{n_i}$ are respectively equal to the corresponding post-precoding values $\rho'_{n_i}$ and/or the corresponding post-precoding values $$\rho_{(\frac{M}{2}+P_1+mod(-n_i+P_1+p-1,Q)}$$

are respectively equal to the corresponding post-precoding value $$\rho'_{(\frac{M}{2}+P_1+mod(-n_i+P_1+p-1,Q)}.$$

This enables to efficiently distinguish and process the reference signals at the receiver side, since the samples corresponding to the first reference signal in the first SC-FDMA symbol and the samples corresponding to the fourth reference signal in the second SC-FDMA symbol are identical and emitted at the same time.

To obtain that the corresponding post-precoding values $\rho_{n_i}$ is equal to the corresponding post-precoding values $\rho'_{n_i}$ in a pre-DFT insertion $$\rho_{(\frac{M}{2}+P_1+mod(-n_i+P_1+p-1,Q)}$$

has to be set to $\varepsilon \rho_{n_i}^*$. To obtain that the corresponding post-precoding values $$\rho_{(\frac{M}{2}+P_1+mod(-n_i+P_1+p-1,Q)}$$

is equal to the corresponding post-precoding values $$\rho'_{(\frac{M}{2}+P_1+mod(-n_i+P_1+p-1,Q)}$$

in a pre-DFT insertion $\rho_{n_i}$ has to be set to $$-\varepsilon \rho_{(\frac{M}{2}+P_1+mod(-n_i+P_1+p-1,Q)}^*.$$

Therefore, in case of pre-DFT insertion only $\rho_{n_i}$ can be equal to $\varepsilon\rho'_{n_i}$ or $$\rho_{(\frac{M}{2}+P_1+mod(-n_i+P_1+p-1,Q))}$$

Can be equal to $$\varepsilon\rho'_{(\frac{M}{2}+P_1+mod(-n_i+P_1+p-1,Q))}.$$

According to an aspect of the invention, a maximum module among modules of values $\rho_{n_i}$, $$\rho_{(\frac{M}{2}+P_1+mod(-n_i+P_1+p-1,Q))}, \rho'_{(\frac{M}{2}+P_1+mod(-n_i+P_1+p-1,Q))}$$

and $\rho'_{n_i}$ with $i \in \llbracket 1;L \rrbracket$, is equal to or smaller than a maximum module among modules of modulation symbols of a digital modulation scheme used to obtain the symbols of the first block of symbols,
with $\rho_{n_i}$, such as the samples in the first SC-FDMA symbol that are obtained from the symbol $X_{n_i}$ whose value is set to $\rho_{n_i}$ are equal to the samples of the first reference signal of quadruplet i in the first SC-FDMA symbol, and $$\rho_{(\frac{M}{2}+P_1+mod(-n_i+P_1+p-1,Q))},$$

such as the samples in the first SC-FDMA symbol that are obtained from the symbol $$X_{(\frac{M}{2}+P_1+mod(-n_i+P_1+p-1,Q))}$$

whose value is set to $$\rho_{(\frac{M}{2}+P_1+mod(-n_i+P_1+p-1,Q))}$$

are equal to the samples of the second reference signal of quadruplet i in the first SC-FDMA symbol, and $$\rho'_{(\frac{M}{2}+P_1+mod(-n_i+P_1+p-1,Q))},$$

such as the samples in the second SC-FDMA symbol that are obtained from the symbol $$Y_{(\frac{M}{2}+P_1+mod(-n_i+P_1+p-1,Q))}$$

whose value is set to $$\rho'_{(\frac{M}{2}+P_1+mod(-n_i+P_1+p-1,Q))}$$

are equal to the samples of the third reference signal of quadruplet i in the second SC-FDMA symbol, and $\rho'_{n_i}$, such as the samples in the second SC-FDMA symbol that are obtained from the symbol $Y_{n_i}$ whose value is set to $\rho'_{n_i}$ are equal to the samples of the fourth reference signal of quadruplet i in the second SC-FDMA symbol.

This enables to insert reference signal without increasing the PAPR. Indeed, the single carrier property is preserved by inserting the reference signals according to the invention, moreover setting the corresponding values taking into account the maximum module of the digital modulation scheme, ensures to preserve the level of the peak to average power ratio.

In case of pre-DFT insertion, this embodiment is identical to setting the value of the symbol $X_{n_i}$ and the value of symbol $$X_{(\frac{M}{2}+P_1+mod(-n_i+P_1+p-1,Q))},$$

such as the modules of these values are equal or smaller than the maximum module of all modulation symbols of a digital modulation scheme used to obtain the block of symbols.

The value $\rho'$ of the symbol may not be effectively set. Indeed, in some cases (for example, when the reference signals are inserted pre-DFT) such value may be indirectly given by the values of the first block of symbols and not set to an arbitrary value. Therefore the value of the symbol is not set to $\rho'$ but simply is the value $\rho'$.

A second aspect of the invention concerns a computer program product comprising code instructions to perform the method as described previously when said instructions are run by a processor.

A third aspect of the invention concerns a device for inserting K quadruplets of a first, a second, a third and a fourth Reference Signals in a radio signal to be transmitted over a wireless communication system, said radio signal being emitted by an emitter comprising at least two transmit antennas, each antenna being configured for transmitting on at least an even number M, strictly greater than 1, of different frequencies, and K being a strictly positive smaller than or equal to M/2, said radio signal being processed by:
applying to a first block of M symbols $X=(X_0, \ldots X_{M-1})$
a precoder to obtain a second block of M symbols $Y=(Y_0, \ldots Y_{M-1})$, with $$Y_k = \begin{cases} \varepsilon X^*_{\frac{M}{2}+P_1+mod(-k+P_1+p-1,Q)}, & \text{for } k \in \llbracket P_1; \frac{M}{2}-P_2 \llbracket \\ -\varepsilon X^*_{P_1+mod(-k+P_1+\frac{M}{2}+p-1,Q)}, & \text{for } k \in \llbracket \frac{M}{2}+P_1; M-P_2 \llbracket \end{cases},$$

with $P_1$ and $P_2$ predefined positive or equal to zero integers, such as $P_1+P_2$ is strictly smaller than M/2, p a predefined integer and $\varepsilon$ is 1 or $-1$ and $X_k^*$ being the complex conjugate of $X_k$;
applying at least a M size DFT then a N size IDFT corresponding to a first transmit antenna, to the first block of M symbols to obtain a first single-carrier frequency division multiple access, SC-FDMA, symbol representing the first block of M symbols, said first SC-FDMA symbol being of a given duration;
applying at least a M size DFT then a N size IDFT corresponding to a second transmit antenna, to the second block of M symbols to obtain a second single-carrier frequency division multiple access, SC-FDMA, symbol representing the second block of M symbols, said second SC-FDMA symbol being of the given duration;

transmitting during a time interval of the given duration, respectively on the first and second transmit antennas, simultaneously the first and second SC-FDMA symbols, into the radio signal;

said device comprising:
a processor; and
a non-transitory computer-readable medium comprising instructions stored thereon, which when executed by the processor configure the device to:
determine a number L smaller than or equal to min(M/2–$P_1$–$P_2$; K) of integers such as $$\left\{ n_i \mid i \in [\![1; L]\!], P_1 \leq n_i < \frac{M}{2} - P_2, \forall i, j \in [\![1; L]\!]^2, i < j \Rightarrow n_i < n_j \right\};$$

and for each i-th quadruplet out of L quadruplets of a first, a second, a third and a fourth Reference Signals among the K quadruplets:
insert the first Reference Signal such as samples of the first Reference Signal are in positions in the first SC-FDMA symbol dependent on a position $n_i$ of the symbol $X_{n_i}$ in the first block of M symbols;
insert the second Reference Signal such as samples of the second Reference Signal are in positions in the first SC-FDMA symbol dependent on a position $$\frac{M}{2} + P_1 + \mathrm{mod}(-n_i + P_1 + p - 1, Q)$$

of the symbol $$X_{\left(\frac{M}{2} + P_1 + \mathrm{mod}(-n_i + P_1 + p - 1, Q)\right)}$$

in the first block of M symbols;
insert the third Reference Signal such as samples of the third Reference Signal are in positions in the second SC-TDMA symbol dependent on a position $n_i$ of the symbol $X_{n_i}$ in the first block of M symbols;
insert the fourth Reference Signal such as samples of the fourth Reference Signal are in positions in the second SC-FDMA symbol dependent on the position $$\frac{M}{2} + P_1 + \mathrm{mod}(-n_i + P_1 + p - 1, Q)$$

of the symbol $$X_{\left(\frac{M}{2} + P_1 + \mathrm{mod}(-n_i + P_1 + p - 1, Q)\right)}$$

in the first block of M symbols.

A fourth aspect of the invention concerns a method for extracting K quadruplets of a first, a second, a third and a fourth Reference Signals, or at the most K quadruplets of a first, a second, a third and a fourth Reference Signals in a radio signal received over a wireless communication system, said radio signal being emitted by an emitter comprising at least two transmit antennas, each antenna being configured for transmitting on at least an even number M, strictly greater than 1; of different frequencies, and K being a strictly positive integer smaller than or equal to M/2, the emission of the radio signal being processed by:
applying to a first block of M symbols $X=(X_0, \ldots X_{M-1})$ a precoder to obtain a second block of M symbols $Y=(Y_0, \ldots Y_{M-1})$, with $$Y_k = \begin{cases} \varepsilon X^*_{\frac{M}{2} + P_1 + \mathrm{mod}(-k + P_1 + p - 1, Q)}, & \text{for } k \in [\![P_1; \frac{M}{2} - P_2[\![ \\ -\varepsilon X^*_{P_1 + \mathrm{mod}(-k + P_1 + \frac{M}{2} + p - 1, Q)}, & \text{for } k \in [\![\frac{M}{2} + P_1; M - P_2[\![ \end{cases},$$

with $P_1$ and $P_2$ predefined positive or equal to zero integers, such as $P_1+P_2$ is strictly smaller than M/2, p a predefined integer and $\varepsilon$ is 1 or $-1$ and $X_k^*$ being the complex conjugate of $X_k$;
applying at least a M size DFT then a N size IDFT corresponding to a first transmit antenna, to the first block of M symbols to obtain a first single-carrier frequency division multiple access. SC-FDMA, symbol representing the first block of M symbols, said first SC-FDMA symbol being of a given duration;
applying at least a M size DFT then a N size IDFT corresponding to a second transmit antenna, to the second block of M symbols to obtain a second single-carrier frequency division multiple access, SC-FDMA, symbol representing the second block of M symbols, said second SC-FDMA symbol being of the given duration;
transmitting during a time interval of the given duration, respectively on the first and second transmit antennas, simultaneously the first and second SC-FDMA symbols, into the radio signal;
said first, second, third and fourth reference signals being inserted in the radio signal by:
determining a number L smaller than or equal to min(M/2–$P_1$–$P_2$; K) of integers such as $$\left\{ n_i \mid i \in [\![1; L]\!], P_1 \leq n_i < \frac{M}{2} - P_2, \forall i, j \in [\![1; L]\!]^2, i < j \Rightarrow n_i < n_j \right\};$$

and for each i-th quadruplet out of L quadruplets of a first, a second, a third and a fourth Reference Signals among the K quadruplets:
inserting the first Reference Signal such as samples of the first Reference Signal are in positions in the first SC-FDMA symbol dependent on a position $n_i$ of the symbol $X_{n_i}$ in the first block of M symbols;
inserting the second Reference Signal such as samples of the second Reference Signal are in positions in the first SC-FDMA symbol dependent on the position $$\frac{M}{2} + P_1 + \mathrm{mod}(-n_i + P_1 + p - 1, Q)$$

of the symbol $$X_{\left(\frac{M}{2} + P_1 + \mathrm{mod}(-n_i + P_1 + p - 1, Q)\right)}$$

in the first block of M symbols;
inserting the third Reference Signal such as samples of the third Reference Signal are in positions in the second SC-FDMA symbol dependent on a position $n_i$ of the symbol $X_{n_i}$ in the first block of M symbols;
inserting the fourth Reference Signal such as samples of the fourth Reference Signal are in positions in the second SC-FDMA symbol dependent on the position $$\frac{M}{2}+P_1+\mathrm{mod}(-n_i+P_1+p-1,Q)$$

of the symbol $$X_{(\frac{M}{2}+P_1+mod(-n_i+P_1+p-1,Q)}$$

in the first block of NT symbols;
said method comprising for at least one quadruplet i of first, second, third and fourth Reference Signals among the L quadruplets:
extracting, before applying N size DFT on the received radio signal, parts of the radio signal, each part being received in one time window among time windows, said time windows being strictly included in the given time interval;
processing said extracted parts independently from other parts of the received radio signal.

According to an aspect of the invention, each time window among the time windows strictly includes at least one time period corresponding to the receiving of samples in a position among the positions in the first and/or second SC-FDMA symbols. Alternatively, each time window is strictly included in at least one time period corresponding to the receiving of samples in a position among the positions in the first and/or second SC-FDMA symbols. Alternatively, each time window is equal to one time period corresponding to the receiving of samples in a position among the positions in the first and/or second SC-FDMA symbols.

In the case of a radio signal provided according to the specific scheme and reference signal inserted according to the invention, this enables to extract parts of the radio signal, received on each receiving antennas, which contain information representative of the reference signals. More precisely the method enables to extract parts of the radio signal that contains information relative to the transmitted reference signals, in the time domain, without extracting parts of the radio signal that contains information relative to samples of non-reference signals, or at the most extracting only parts of the radio signal that contains residual information relative to the samples of non-reference signals.

This extraction is implemented in the time domain on the received radio signal, that is before applying the DFT modules associated with each receive antennas Rx1, . . . RxQ, regarding the FIG. 5.

For any emission at the transmitter side that occurs in a given time period there is a corresponding time period at the receiver side during which the received signal is representative of the information transmitted at the transmitter side in the given time period. With respect to a fixed time reference, there is a time difference between the beginning of the given time period at the transmitter side and the beginning of the corresponding time period at the receiver side, accounting for e.g., propagation delays and/or hardware effects.

In the following, to clarify the explanations, we will consider that given time period at the transmitter side and the corresponding time period at the receiver side are understood with respect to relative time references which are the beginning of the emission respectively the reception of the first and second block of symbols. Therefore, given time period at the transmitter side and the corresponding time period at the receiver side are identical or at least similar. We will refer to such time periods at the receiver side as time period corresponding to the receiving of samples in a position in the first and/or second SC-FDMA symbols dependent on the position n of the symbol $X_n$ in the first and/or second SC-FDMA symbols.

The samples extracted are the received samples in a position in the first SC-FDMA symbol dependent on a position $n_i$ and position $$\frac{M}{2}+P_1+\mathrm{mod}(-n_i+P_1+p-1,Q)$$

and in a position in the second SC-FDMA symbol also dependent on a position $n_i$ and position $$\frac{M}{2}+P_1+\mathrm{mod}(-n_i+P_1+p-1,Q),$$

that is the received samples of the corresponding symbols $X_{n_i}$, $$X_{(\frac{M}{2}+P_1+mod(-n_i+P_1+p-1,Q)},$$

or the received samples of the corresponding post-precoding symbols $X_{n_i}$, $$X_{(\frac{M}{2}+P_1+mod(-n_i+P_1+p-1,Q)},$$

$Y_{n_i}$ and $$Y_{(\frac{M}{2}+P_1+mod(-n_i+P_1+p-1,Q)}$$

with $i \in [\![1;L]\!]$, these samples being received on each antennas of the receiver.

Therefore, the parts of the received radio signal which are extracted lie in time domain windows that encompass at least part of the time periods (at the receiver side) corresponding to the receiving of samples in the positions in the first and/or second SC-FDMA symbols dependent on the position $n_i$ and $$\frac{M}{2}+P_1+\mathrm{mod}(-n_i+P_1+p-1,Q)$$

of the symbols $X_{n_i}$ and $$X_{\left(\frac{M}{2}+P_1+mod(-n_i+P_1+p-1,Q)\right)}$$

in the first and/or second SC-FDMA symbols.

These time periods are determined relatively to the beginning of the receiving of the bloc of symbols, as it is commonly done in a receiver. Therefore, the time periods during which the radio signal is extracted are identical or at least similar than the time periods corresponding to the receiving of samples in positions in the first and/or second SC-FDMA symbols dependent on the positions $n_i$ and/or $$\frac{M}{2}+P_1+mod(-n_i+P_1+p-1,Q),$$

thus these time periods are not distinguished, and it will be indifferently be referred to them as time periods, corresponding time periods or time periods dependent to the position $n_i$ and/or $$\frac{M}{2}+P_1+mod(-n_i+P_1+p-1,Q).$$

After extraction, the received samples of the reference signal are processed. The processing can be made independently from the received samples of non-reference signals. The processing scheme applied to the received samples of the reference signals is based on classical algorithms allowing estimating various parameters when reference signals with values and positions known by the receiver are transmitted from a transmitter.

Once processed the receiver may evaluate channel perturbation which impacts the radio signal. For example the receiver may deduce phase estimation which may enable to improve channel estimation or directly deduce the channel estimation. According to the channel estimation the decoding modules may be set to compensate the corruption (phase shift, amplitude . . . ) of the signal in the channel between transmitter and receiver.

A fifth aspect of the invention concerns a device for extracting K quadruplets of a first, a second, a third and a fourth Reference Signals in a radio signal received over a wireless communication system, said radio signal being emitted by an emitter comprising at least two transmit antennas, each antenna being configured for transmitting on at least an even number M, strictly greater than 1, of different frequencies, and K being a strictly positive integer smaller than or equal to M/2, the emission of the radio signal being processed by:

applying to a first block of M symbols $X=(X_0, \ldots X_{M-1})$ a precoder to obtain a second block of M symbols $Y=(Y_0, \ldots Y_{M-1})$, with $$Y_k = \begin{cases} \varepsilon X^*_{\frac{M}{2}+P_1+mod(-k+P_1+p-1,Q)}, & \text{for } k \in [\![P_1; \frac{M}{2}-P_2[\![ \\ -\varepsilon X^*_{P_1+mod(-k+P_1+\frac{M}{2}+p-1,Q)}, & \text{for } k \in [\![\frac{M}{2}+P_1; M-P_2[\![ \end{cases},$$

with $P_1$ and $P_2$ predefined positive or equal to zero integers, such as $P_1+P_2$ is strictly, smaller than M/2, p a predefined integer and s is $\varepsilon$ 1 or $-1$ and $X_k^*$ being the complex conjugate of $X_k$;

applying at least a M size DFT then a N size IDFT corresponding to a first transmit antenna, to the first block of M symbols to obtain a first single-carrier frequency division multiple access, SC-FDMA, symbol representing the first block of M symbols, said first SC-FDMA symbol being of a given duration;

applying at least a M size DFT then a N size IDFT corresponding to a second transmit antenna, to the second block of M symbols to obtain a second single-carrier frequency division multiple access, SC-FDMA, symbol representing the second block of M symbols, said second SC-FDMA symbol being of the given duration;

transmitting during a time interval of the given duration, respectively on the first and second transmit antennas, simultaneously the first and second SC-FDMA symbols, into the radio signal;

said first, second, third and fourth reference signals being inserted in the radio signal by:

determining a number L smaller than or equal to $\min(M/2-P_1-P_2; K)$ of integers such as $$\left\{ n_i \mid i \in [\![1;L]\!], P_1 \le n_i < \frac{M}{2}-P_2, \forall i,j \in [\![1;L]\!]^2, i<j \Rightarrow n_i < n_j \right\};$$

and for each i-th quadruplet out of L quadruplets of a first, a second, a third and a fourth Reference Signals among the K quadruplets:

inserting the first Reference Signal such as samples of the first Reference Signal are in positions in the first SC-FDMA symbol dependent on a position $n_i$ of the symbol $X_{n_i}$ in the first block of M symbols;

inserting the second Reference Signal such as samples of the second Reference Signal are in positions in the first SC-FDMA symbol dependent on the position $$\frac{M}{2}+P_1+mod(-n_i+P_1+p-1,Q)$$

of the symbol $$X_{\left(\frac{M}{2}+P_1+mod(-n_i+P_1+p-1,Q)\right)}$$

in the first block of M symbols;

inserting the third Reference Signal such as samples of the third Reference Signal are in positions in the second SC-FDMA symbol dependent on a position $n_i$ of the symbol $X_{n_i}$ in the first block of M symbols;

inserting the fourth Reference Signal such as samples of the fourth Reference Signal are in positions in the second. SC-FDMA symbol dependent on the position $$\frac{M}{2}+P_1+mod(-n_i+P_1+p-1,Q)$$

of the symbol $$X_{(\frac{M}{2}+P_1+mod(-n_i+P_1+p-1,Q)}$$

in the first block of M symbols;
said device comprising:
a processor; and
a non-transitory computer-readable medium comprising instructions stored thereon, which when executed by the processor configure the device to,
for at least one quadruplet i of first, second, third and fourth Reference Signals:
extract, before applying N size DFT modules on the received radio signal, parts of the radio signal, each part being received in one time window among time windows, said time windows being strictly included in the given time interval;
process said extracted parts independently from other parts of the received radio signal.

The present invention is illustrated by way of example, and not by way of limitation, in the figures of the accompanying drawings, in which like reference numerals refer to similar elements.

BRIEF DESCRIPTION OF DRAWINGS

FIG. 2.1 schematizes a block diagram of a classical SS-STBC transmitter.
FIG. 2.2 details the SS-STBC pre-coder logical functioning.
FIG. 4.1 schematizes a block diagram of pre-DFT insertion of RS according to the invention.
FIG. 4.2 schematizes a block diagram of post pre-coder insertion of RS according to the invention.
FIG. 4.3 schematizes a block diagram of post-IDFT insertion of RS according to the invention.
FIG. 6.1 illustrates a flowchart representing the steps of pre-DFT inserting reference signals in the radio signal according to the invention.
FIG. 6.2 illustrates a flowchart representing the steps of post pre-coding insertion of reference signals in the radio signal according to the invention.
FIG. 6.3 illustrates a flowchart representing the steps of post-IDFT inserting reference signals in the radio signal according to the invention.
FIG. 7 illustrates a flowchart representing the steps of extracting reference signals in the radio signal according to the invention.

DESCRIPTION OF EMBODIMENTS

Figure 1:
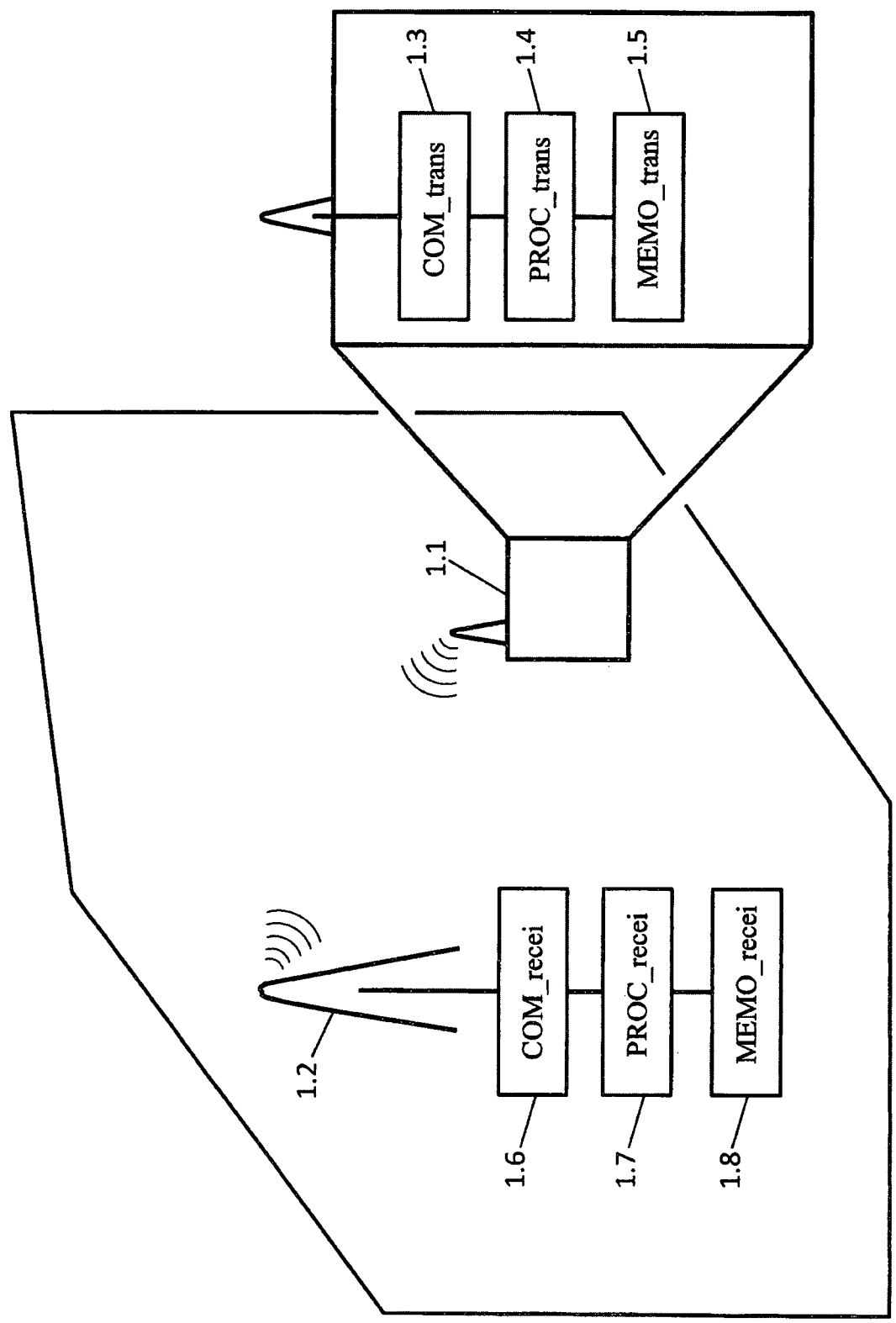
FIG. 1 illustrates a SS-STBC type transmitter and receiver.

Referring to FIG. 1, there is shown a transmitter 1.1 transmitting a radio signal to a receiver 1.2. The transmitter 1.1 is in the cell of the receiver 1.2. This transmission may be a SS-STBC based transmission in the context of OFDM based system. In this example the transmitter 1.1 is a mobile terminal and the receiver 1.2 is a fixed station which in the context of LTE is a base station. The transmitter 1.1 can as well be the fixed station and the receiver 1.2 a mobile terminal.

The transmitter 1.1 comprises one communication module (COM_trans) 1.3, one processing module (PROC_trans) 1.4 and a memory unit (MEMO_trans) 1.5. The MEMO_trans 1.5 comprises a non-volatile unit which retrieves the computer program and a volatile unit which retrieves the reference signal parameters. The PROC_trans 1.4 which is configured to insert the reference signals according to the invention. The COM_trans is configured to transmit to the receiver 1.2 the radio signal. The processing module 1.4 and the memory unit 1.5 may constitute the device for inserting the reference signals, as previously described. The processing module 1.4 and the memory unit 1.5 can be dedicated to this device or also used for other functions of the transmitter like for processing the radio signal.

The receiver 1.2 comprises one communication module (COM_recei) 1.6, one processing module (PROC_recei) 1.7 and a memory unit (MEMO_recei) 1.8. The MEMO_recei 1.8 comprises a non-volatile unit which retrieves the computer program and a volatile unit which retrieves the reference signal parameters. The PROC_recei 1.7 is configured to extract the reference signals from the radio signal. The COM_recei 1.6 is configured to receive from the transmitter the radio signal. The processing module 1.7 and the memory unit 1.8 may constitute the device for extracting the reference signals, as previously described. The processing module 1.7 and the memory unit 1.8 can be dedicated to this device or also used for other functions of the receiver like for processing the receiving scheme on the radio signal.

Referring to FIG. 2.1, there is shown a block diagram of a classical SS-STBC transmitter. Such SS-STBC transmitters apply SC-FDMA schemes on a block of symbols (first block of symbols) and a pre-coded block of symbols (second block of symbols) to obtain the radio signal. This ensures full diversity for a rate of one symbol per channel use. An SS-STBC transmitter emits a radio signal by emitting on at least two transmit antennas Tx1 2.0 and Tx2 2.1.

The radio signal being provided by applying a SS-STBC pre-coder 2.2 to a first block of symbols $X=(X_0, \ldots X_{M-1})$ and obtaining a second block of symbols $Y=(Y_0, \ldots Y_{M-1})$. The first block of symbols may be obtained by a QPSK digital modulation scheme or any other digital modulation scheme as QAM. M is the number of allocated subcarriers. In such SS-STBC scheme, M is even.

Then, a M-size DFT 2.3, 2.4 (discrete Fourier transform) is applied to each block of symbols X and Y. For each block of symbols, M complex symbols are obtained in the frequency domain, which are respectively $(s_k^{Tx1})_{k\in[0,M-1]}$ and $(s_k^{Tx2})_{k\in[0,M-1]}$ That is for each M-size DFT 2.3, 2.4, one complex symbol is obtained for each k-th subcarrier among the M allocated subcarriers. These complex symbols are mapped, with subcarrier mapping modules 2.5 and 2.6 in the frequency domain to M out of N inputs of N-size IDFT modules, 2.7, 2.8. Regarding the subcarrier mapping, each vector of complex symbols $S^{Tx1}=(s_k^{Tx1})_{k\in[0,M-1]}$ and $S^{Tx2}=(s_k^{Tx2})_{k\in[0,M-1]}$ is mapped to the M allocated subcarriers out of N existing subcarriers via subcarrier mapping modules 2.5 and 2.6. The subcarrier mapping can be for example localized, that is the M elements of each vector $S^{Tx1,2}$ are mapped to M consecutive subcarriers among the N existing. The subcarrier mapping can be for example distributed, that is the M elements of each vector $S^{Tx1,2}$ are mapped equally distanced over the entire bandwidth with zero occupying the unused subcarriers.

Inverse DFT of size N 2.7 and 2.8 are then applied to the two resulting vectors $\tilde{S}^{Tx1}$ and $\tilde{S}^{Tx2}$ of the subcarrier mapping modules 2.5 and 2.6, therefore generating two SC-FDMA symbols, each of them being sent at the same time from respectively one of the two transmit antennas. More precisely, at the output of the IDFT modules, 2.7, 2.8 a signal $\tilde{x}^{Tx1}=(\tilde{x}^{Tx1}_0, \ldots, \tilde{x}^{Tx1}_{N-1})$ and a signal $\tilde{x}^{Tx2}=(\tilde{x}^{Tx2}_0, \ldots, \tilde{x}^{Tx2}_{N-1})$, are obtained. Each of these signals occupy during a time interval corresponding to a single-carrier frequency division multiple access, SC-FDMA, symbol, M allocated subcarriers out of the N existing subcarriers. The signals $\tilde{x}^{Tx1}$ and $\tilde{x}^{Tx2}$ are time-domain signal whose frequency-domain representations, during a given time interval, are respectively the complex symbols $S_k^{Tx1}$ and $S_k^{Tx2}$ for each $k^{th}$ occupied subcarrier with k=0 to M−1. Equivalently, the time-domain signals $\tilde{x}^{Tx1}$ and $\tilde{x}^{Tx2}$ during a given time interval represent respectively, in the frequency domain, the complex symbols $S_k^{Tx1}$ and $S_k^{Tx2}$ for each $k^{th}$ frequency with k=0 to M−1. These time-domains signals $\tilde{x}^{Tx1}$ and $\tilde{x}^{Tx2}$ respectively correspond to SC-FDMA symbols. Therefore, samples in the signal $\tilde{x}^{Tx1}$ or in the signal $\tilde{x}^{Tx2}$ refer respectively to samples in a SC-FDMA symbol corresponding to a first transmit antenna 2.0 and to samples in a SC-FDMA symbol corresponding to a second transmit antenna 2.1.

A cyclic prefix can be optionally appended after IDFT.

Referring to FIG. 2.2 there is shown in detail the logical functioning of a SS-STBC pre-coder module 2.2.

The SS-STBC pre-coder 2.2 applied to the block of symbols $X=(X_0, \ldots X_{M-1})$ (also referred as the first block of symbols) outputs the block of symbols $Y=(Y_0, \ldots Y_{M-1})$ (also referred as the second block of symbols). Considering the first block of symbols $X=(X_0, \ldots X_{M-1})$ this one is divided in two parts of M/2 symbols as showed on FIG. 2.2. The first, respectively the second part, contains Q contiguous modulation symbols $(A_n)_{n\in[0;Q-1]}$, respectively contiguous symbol $(B_n)_{n\in[0;Q-1]}$. The Q contiguous modulation symbols of the first part and the second part contain data and reference signals.

To limit the interference between the two parts of the block symbols, the first part may contain a cyclic prefix of $P_1$ contiguous symbols and/or a cyclic postfix of $P_2$ contiguous symbols respectively positioned before and after the Q contiguous modulation symbols $(A_n)_{n\in[0;Q-1]}$. The second part may also contain a cyclic prefix of $P_1$ contiguous symbols and/or a cyclic postfix of $P_2$ contiguous symbols respectively positioned before and after the Q contiguous modulation symbols $(B_n)_{n\in[0;Q-1]}$. P1 and/or P2 values may also be set to 0, and in that case no prefix and/or no postfix is included.

Therefore, the first block of symbols $X=(X_0, \ldots X_{M-1})$ can be defined:

$X_0=A_{Q-P_1}, \ldots, X_{P_1-1}=A_{Q-1}$, for the cyclic prefix of the first part, $X_{P_1}=A_0, X_{P_1+1}=A_1, \ldots, X_{P_1+Q-1}=A_{Q-1}$, for the data/RS symbols of the first part, $$X_{P_1+Q} = A_0, \ldots, X_{\frac{M}{2}-1} = A_{P_2-1},$$

for the cyclic postfix of the first part, $X_{M/2}=B_{Q-P_1}, \ldots, X_{M/2+P_1-1}=B_{Q-1}$, for the cyclic prefix of the second part, $X_{P_1+M/2}=B_0, X_{P_1+M/2+1}=B_2, \ldots, X_{M-P_2-1}=B_{Q-1}$, for the data/RS symbols of the second part, $X_{M-P_2}=B_0, \ldots, X_{M-1}=B_{P_2-1}$, for the cyclic postfix of the second part.

When applying the SS-STBC pre-coder to the first block of symbols $X=(X_0, \ldots X_{M-1})$, the second block of symbols $Y=(Y_0, \ldots Y_{M-1})$ is obtained. This second block of symbols can be defined relatively to the first block of symbols previously defined, as:

$Y_0=\tilde{B}_{Q-P_1}, \ldots, Y_{P_1-1}=\tilde{B}_{Q-1}$, for the cyclic prefix of the first part, $Y_{P_1}=\tilde{B}_0, Y_{P_1+1}=\tilde{B}_1, \ldots, Y_{P_1+Q-1}=\tilde{B}_{Q-1}$, for the data/RS symbols of the first part, $$Y_{P_1+Q} = \tilde{B}_0, \ldots, Y_{\frac{M}{2}-1} = \tilde{B}_{P_2-1},$$

for the cyclic postfix of the first part, $Y_{M/2}=-\tilde{A}_{Q-P_1}, \ldots, Y_{M/2+P_1-1}=-\tilde{A}_{Q-1}$, for the cyclic prefix of the second part, $Y_{P_1+M/2}=-\tilde{A}_0, Y_{P_1+M/2+1}=-\tilde{A}_2, \ldots, Y_{M-P_2-1}=-\tilde{A}_{Q-1}$, for the data/RS symbols of the second part, $Y_{M-P_2}=-\tilde{A}_0, \ldots, Y_{M-1}=-\tilde{A}_{P_2-1}$, for the cyclic postfix of the second part.

With $\tilde{A}_n=A^*_{mod(-n,Q)}$ and $\tilde{B}_n=B^*_{mod(-n,Q)}$ and X* is the complex conjugate of X.

Therefore, Y can be defined, regarding the payload data and Reference signal symbols based on X by:

$$Y_k = \begin{cases} \varepsilon X^*_{\frac{M}{2}+2P_1+Q-k}, & \text{for } k \in [\![P_1; \frac{M}{2}-P_2[\![ \\ -\varepsilon X^*_{\frac{M}{2}+2P_1+Q-k}, & \text{for } k \in [\![\frac{M}{2}+P_1; M-P_2[\![ \end{cases}$$

With ε the value 1 or −1 When not stated otherwise, in the following we consider ε=1. Indeed, changing the sign (+/−) of the signal related to the second antenna does not change the method.

In the case of the invention the pre-coder is a modified SS-STBC pre-coder which is defined by:

$$Y_k = \begin{cases} \varepsilon X^*_{\frac{M}{2}+P_1+mod(-k+P_1+p-1,Q)}, & \text{for } k \in [\![P_1; \frac{M}{2}-P_2[\![ \\ -\varepsilon X^*_{P_1+mod(-k+P_1+\frac{M}{2}+p-1,Q)}, & \text{for } k \in [\![\frac{M}{2}+P_1; M-P_2[\![ \end{cases}$$

That is when applying the SS-STBC modified pre-coder to the first block of symbols $X=(X_0, \ldots X_{M-1})$, the second block of symbols $Y=(Y_0, \ldots Y_{M-1})$ can be defined relatively to the first block, as:

$Y_0=\tilde{B}_{Q-P_1}, \ldots, Y_{P_1-1}=\tilde{B}_{Q-1}$, for the cyclic prefix of the first part, $Y_{P_1}=\tilde{B}_0, Y_{P_1+1}=\tilde{B}_1, \ldots, Y_{P_1+Q-1}=\tilde{B}_{Q-1}$, for the data/RS symbols of the first part, $$Y_{P_1+Q} = \tilde{B}_0, \ldots, Y_{\frac{M}{2}-1} = \tilde{B}_{P_2-1},$$

for the cyclic postfix of the first part, $Y_{M/2}=-\tilde{A}_{Q-P_1}, \ldots, Y_{M/2+P_1-1}=-\tilde{A}_{Q-1}$, for the cyclic prefix of the second part, $Y_{P_1+M/2}=-\tilde{A}_0, Y_{P_1+M/2+1}=-\tilde{A}_2, \ldots, Y_{M-P_2-1}=-\tilde{A}_{Q-1}$, for the data/RS symbols of the second part, $Y_{M-P_2}=-\tilde{A}_0, \ldots, Y_{M-1}=-\tilde{A}_{P_2-1}$, for the cyclic postfix of the second part.

With $\tilde{A}_n = A^*_{mod(-n+p-1, Q)}$ and $\tilde{B}_n = B^*_{mod(-n+p-1, Q)}$.

Such a SS-STBC modified pre-coder enables to have more flexibility in the applied scheme.

Figure 3:
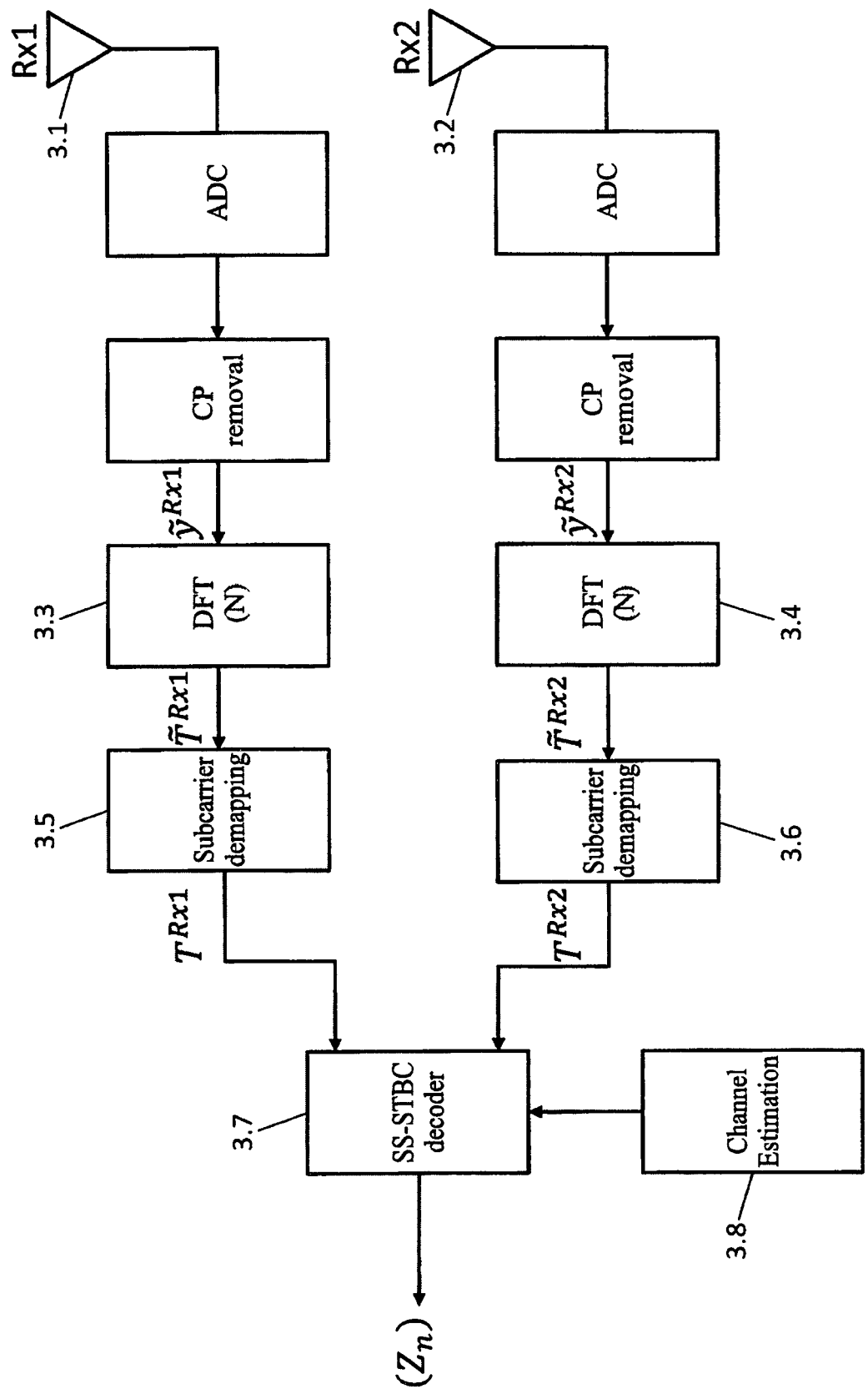
FIG. 3 schematizes a block diagram of a classical SS-STBC receiver.

Referring to FIG. 3, there is shown a block diagram of a classical SS-STBC receiver. Such a receiver is configured to decode a radio signal emitted by a SS-STBC transmitter. This example shows 2 receive antennas but such receiver can have only one antenna (MISO) or a several antennas (MIMO). In this example said radio signal is received on two antennas Rx1 3.1 and Rx2 3.2. The radio signal received by each antennas differs, and the more the two antennas are spaced from each other the more the radio signal received on each antennas is likely to be different, which introduces receive diversity. After an optional guard removal the resulting signals Rx1 and Rx2 are inputted into two N-size DFT (3.3 and 3.4) and then in subcarriers de-mapping modules (3.5 and 3.6), one associated to Rx1 3.1 one associated with Rx2 3.2.

The result in the frequency domain is two vectors $T^{Rx1}$ and $T^{Rx2}$. Before inputting $T^{Rx1}$ and $T^{Rx2}$ in the SS-STBC decoder 3.7, the SS-STBC decoder 3.7 can be adjusted based on the channel estimation (made by a channel estimation module 3.8), channel estimation which is computed for example on the basis of received DMRS (demodulation reference signal). Afterwards, the $T^{Rx1}$ and $T^{Rx2}$ are inputted in the SS-STBC decoder 3.7 which outputs a block Z of M symbols $(Z_0, \ldots Z_{M-1})$ in the time domain. Additional modification may be performed at the output of the SS-STBC decoder 3.7 to obtain the block of symbols Z, for example constellation de-mapping and error correction, enables estimating the digital data at the origin of X.

If reference signals are pre-DFT inserted in random position and multiplexed with the data modulation symbols at the DFT input, the samples of the reference signals received cannot be extracted from the received signal and processed before obtaining at first the block of symbols Z at the output of the SS-STBC decoder 3.7. Therefore, the SS-STBC decoder 3.7 will decode $T^{Rx1}$ and $T^{Rx2}$ without taking into account the information conveyed by the reference signals, which can lead to strongly degraded performance of the SS-STBC decoder 3.7.

Referring to FIG. 4.1, there is shown a block diagram of Pre-DFT insertion of reference signals according to the invention. Regarding the transmitter, the scheme applied is the modified SS-STBC scheme described in FIGS. 2.1 and 2.2.

Therefore, a modified SS-STBC pre-coder 4.2 (simply referenced below as a SS-STBC pre-coder), M-size DFTs 4.3 and 4.4, subcarrier mapping modules 4.5 and 4.6 and N size IDFT modules 4.7 and 4.8 are successively applied to the block of symbols $X=(X_0, \ldots X_{M-1})$ to obtain the radio signal emitted by Tx1 4.0 and Tx2 4.1.

In this embodiment, reference signal are inserted pre-DFT, that is by setting values of the symbols $X_n$ which are chosen to be reference signals. Therefore, when inserting 4K reference signals, K being a positive integer smaller or equal to M/2 (it may be set strictly smaller than M/2 to avoid the block of symbols X to be a full block of reference signals), L integers $n_i$ are to be determined such as $$\{n_i \mid i \in [\![1; L]\!], P_1 \leq n_i < \frac{M}{2} - P_2, \forall i, j \in [\![1; L]\!]^2, i < j \Rightarrow n_i < n_j\}$$

Then reference signals (RSs) are inserted directly in the block of symbol X at the positions $n_i$ and $$\frac{M}{2} + P_1 + \text{mod}(-n_i + P_1 + p - 1, Q).$$

The RS insertion module 4.9 inserts the reference signals by setting each value of the symbols $X_n$ which are at positions $n_i$ or $n_i+M/2$ with $i \in [\![1;L]\!]$ at a value of a reference signal. The RS insertion module 4.9 may be configured in a static way by previously configuring the positions $n_i$ or $$\frac{M}{2} + P_1 + \text{mod}(-n_i + P_1 + p - 1, Q)$$

with $i \in [\![1;L]\!]$. Several configurations may also be previously programmed, for example one configuration for each number K, or a limited number of configurations for each number K. Exact values of K and $(n_i)$ can be either fixed, or configurable. Configuration can be done in an implicit manner (based on other parameters known by the transmitter), or in an explicit manner (based on instructions that the receiver is returning to the transmitter via, e.g., a control channel), or a combination of the two. The Data modulator module 4.10 may be configured to insert modulation symbols into the block of symbols in positions that not conflict with the positions $n_i$ or $$\frac{M}{2} + P_1 + \text{mod}(-n_i + P_1 + p - 1, Q)$$

with $i \in [\![1;L]\!]$ of the reference signals. The RS insertion module 4.9 may inform the Data modulator module 4.10 of the chosen configuration. Regarding the implementation described in FIG. 2, only 2Q symbols are used, the symbols in the two cyclic prefix parts and in the two cyclic suffix parts are defined based on the used symbols. Therefore, only L pairs of symbols are defined here, the remaining K–L pairs being defined by the L pairs. Thus, L is smaller or equal to min(M/2−$P_1$−$P_2$; K) (it may be set smaller or equal to min(M/2−$P_1$−$P_2$−1; K) to avoid the block of symbols X to be a full block of reference signals).

Positions $$\{n_i \mid i \in [\![1; L]\!], P_1 \leq n_i < \frac{M}{2} - P_2, \forall i, j \in [\![1; L]\!]^2, i < j \Rightarrow n_i < n_j\}$$

can be advantageously chosen. For example, the RS insertion module 4.9 may be configured with the positions $n_i$ consecutive, that is with $n_L - n_1 = L - 1$. Grouping the RS on consecutive positions enables to reduce the interference suffered by the RS from other symbols in the radio signal.

In another example, the positions $\{n_i | i \in [\![1;L]\!]\}$ of the RS can be divided in groups of consecutive positions. That is for example, 3 groups of RS of consecutive positions $n_1$ to $n_{k'_1}$, $n_{k_2}(n_{k_2} > n_{k'_1})$ to $n_{k'_2}$ and $n_{k_3}(n_{k_3} > n_{k'_2})$ to $n_L$, where $n_{k'_1} - n_1 = k'_1 - 1$, $n_{k'_2} - n_{k_2} = k'_2 - k_2$ and $n_L - n_{k_3} = L - k_3$. Having several groups which are separated by other symbols in the block of symbols X, enables to track fast phase variations at a lower level than the time duration of a block of symbols.

Regarding the values of the symbols $X_{n_i}$ and $$X_{(\frac{M}{2}+P_1+mod(-n_i+P_1+p-1,Q))}$$

with $i \in [\![1;L]\!]$, that is the symbols of X positioned at $n_i$ and $$\frac{M}{2}+P_1+mod(-n_i+P_1+p-1,Q)$$

for $i \in [\![1;L]\!]$, they may be set as components of a CAZAC sequence. More specifically the values of the symbols $X_{n_i}$ with $i \in [\![1;L]\!]$ can be derived from values of a first CAZAC sequence and/or the values of the symbols $$X_{(\frac{M}{2}+P_1+mod(-n_i+P_1+p-1,Q))}$$

with $i \in [\![1;L]\!]$ can be derived from values of a second CAZAC sequence. It can be advantageous to select the second CAZAC sequence such that symbols $Y_{n_i}$, with $\{n_i | i \in [\![1;L]\!]\}$ are components of a CAZAC sequence, orthogonal to the first one.

The CAZAC sequences may be for example Zadoff-Chu sequences. That is for example with the values of $X_{n_i}$ with $i \in [\![1;L]\!]$, can be set to the values of a CAZAC sequence of length L, or can be obtained by truncating a CAZAC sequence of length superior to L, or can be obtained by cyclic extension from a CAZAC sequence of length inferior to L.

It is advantageous to set values for $X_{n_i}$ and $$X_{(\frac{M}{2}+P_1+mod(-n_i+P_1+p-1,Q))}$$

with $i \in [\![1;L]\!]$, such as the maximum absolute values modules are equal or smaller than the maximum absolute values of the modulation symbols of the digital modulation scheme used for modulation. For example, the digital modulation scheme can be QPSK (quadrature phase-shift keying) or other PSK (phase-shift keying) whose values are all of module equal to 1, in this example the values of $|X_{n_i}|$ and $$\left| X_{(\frac{M}{2}+P_1+mod(-n_i+P_1+p-1,Q))} \right|$$

are chosen as to be smaller or equal to 1.

Referring to FIG. 4.2, there is shown a block diagram of post pre-coder insertion of reference signals according to the invention. Regarding the transmitter, the scheme applied is the modified SS-STBC scheme described in FIG. 2.1, 2.2.

Therefore, a modified SS-STBC pre-coder 4.2 (simply referenced below as a SS-STBC pre-coder), M-size DFTs 4.3 and 4.4, subcarrier mapping modules 4.5 and 4.6 and N size IDFT modules 4.7 and 4.8 are successively applied to the block of symbols $X=(X_0, \ldots X_{M-1})$ to obtain the radio signal emitted by Tx1 4.0 and Tx2 4.1.

In this embodiment, reference signal are inserted post pre-coder, that is by setting values of the symbols $X_n$ and $Y_n$ which are chosen to be reference signals. For this, the data modulator module 4.12 is configured to set the values of the symbols $X_{n_i}$ and $$X_{(\frac{M}{2}+P_1+mod(-n_i+P_1+p-1,Q))}$$

with $i \in [\![1;L]\!]$ to 0. The configuration of the data modulator module 4.12 may be made by the RS insertion module 4.11 which can send the position configuration to the data modulator module 4.12. On this incomplete block of symbols $X_{DATA}$, a SS-STBC pre-coder 4.2 is applied to obtain a block of symbols $Y_{DATA}=(Y_n)$. Then the reference signals (RSs) are inserted directly in those two blocks of symbols, the first and second block of symbols $X_{DATA}$ and $Y_{DATA}$ at the positions $n_i$ and $$\frac{M}{2}+P_1+mod(-n_i+P_1+p-1,Q).$$

For each quadruplet $i \in [\![1;L]\!]$ of reference signals, the RS insertion module 4.11 inserts the reference signals by setting the values of the symbols $X_{n_i}$, $$X_{\frac{M}{2}+P_1+mod(-n_i+P_1+p-1,Q)},$$

$Y_{n_i}$ and $$Y_{\frac{M}{2}+P_1+mod(-n_i+P_1+p-1,Q)}$$

to values representing the first, second, fourth and respectively third reference signals. In this configuration each value of the reference signals of a given quadruplet of reference signals can be set independently. Therefore, only the time periods of the samples of each reference signal in the same quadruplet depends on the other reference signals of the quadruplet.

The RS insertion module 4.11 may be configured in a static way by previously configuring the positions $n_i$ or $$\frac{M}{2}+P_1+mod(-n_i+P_1+p-1,Q)$$

with $i \in [\![1;L]\!]$. Several configurations may also be previously programmed, for example one configuration for each number K or a limited number of configurations for each number K. Exact values of K and $(n_i)_i$ can be either fixed, or configurable. Configuration can be done in an implicit manner (based on other parameters known by the transmitter), or in an explicit manner (based on instructions that the receiver is returning to the transmitter via, e.g., a control channel). The Data modulator module 4.12 may be configured to insert modulation symbols into the block of symbols in positions that do not conflict with the positions $n_i$ or $$\frac{M}{2}+P_1+mod(-n_i+P_1+p-1,Q)$$

with $i \in [\![1;L]\!]$ of the reference signals. The RS insertion module 4.11 may inform the Data modulator module 4.12 of the chosen configuration. Regarding the implementation described in FIG. 2.1, only 2Q symbols are used, the symbols in the two cyclic prefix parts and in the two cyclic suffix parts are defined based on the used symbols. Therefore, only L quadruplets of symbols are defined here the remaining K–L quadruplets being defined by the L quadruplets. Thus, L is smaller or equal to $\min(M/2-P_1-P_2; K)$ (it may be set smaller or equal to $\min(M/2-P_1-P_2-1; K)$ to avoid the block of symbols X to be a full block of reference signals).

Once the reference signal inserted the SC-FDMA schemes are applied on each block of symbols (first and second block of symbols) to obtain a first and second SC-FDMA symbol which are transmitted through the emitted radio signal.

In the embodiment of the FIG. 4.2, where the reference signals are inserted post pre-coder, the first and second SC-FDMA symbols obtained are the same or equivalent to the ones obtained when inserting the reference signals in a pre-DFT manner. Therefore, all the features shown in relation with pre-DFT insertion can be applied to post pre-coder insertion.

For example, the positions advantageously chosen in pre-DFT insertion can be applied, by setting to 0 the symbols at those positions and then inserting post pre-coder the reference signals in those positions.

In the embodiments that set the values of the symbols $X_{n_i}$ and $$X_{(\frac{M}{2}+P_1+mod(-n_i+P_1+p-1,Q))},$$

with $i \in [\![1;L]\!]$, these embodiments can be applied in the case of post pre-coder insertion, by setting the values of the symbols $X_{n_i}$ and $$X_{(\frac{M}{2}+P_1+mod(-n_i+P_1+p-1,Q))},$$

with $i \in [\![1;L]\!]$ to the values at would have been set for the symbols $X_{n_i}$ and $$X_{(\frac{M}{2}+P_1+mod(-n_i+P_1+p-1,Q))}$$

if they were set pre-DFT, and setting the values of the symbols $Y_{n_i}$ and $$Y_{(\frac{M}{2}+P_1+mod(-n_i+P_1+p-1,Q))},$$

to values according to the transformation operated by the SS-STBC.

In addition, even if the values in the second block of symbols of the third and fourth reference signals are chosen independently than the values in the first block of symbols of the first and second reference signals these embodiments can still be applied. Indeed, the positions are identical between the two embodiments. Therefore, the specific position described can be reproduced in this embodiment.

Regarding the values of the symbols $X_{n_i}$, $$X_{(\frac{M}{2}+P_1+mod(-n_i+P_1+p-1,Q))},$$

$Y_{n_i}$ and $$Y_{(\frac{M}{2}+P_1+mod(-n_i+P_1+p-1,Q))}$$

with $i \in [\![1;L]\!]$ they may be set as components of a CAZAC sequence. Each value of the reference signals in a same quadruplet can be derived from different CAZAC sequences or from the same CAZAC sequence. The CAZAC sequences may be for example Zadoff-Chu sequences.

The values of the symbols $X_{n_i}$, $$X_{(\frac{M}{2}+P_1+mod(-n_i+P_1+p-1,Q))},$$

$Y_{n_i}$ and $$Y_{(\frac{M}{2}+P_1+mod(-n_i+P_1+p-1,Q))}$$

may also be set to have the values of $X_{n_i}$ and $Y_{n_i}$ respectively $$X_{(\frac{M}{2}+P_1+mod(-n_i+P_1+p-1,Q))} \text{ and } Y_{(\frac{M}{2}+P_1+mod(-n_i+P_1+p-1,Q))}$$

equal. In addition, it is also possible to set these values to have the values of $X_{n_i}$ and $$X_{(\frac{M}{2}+P_1+mod(-n_i+P_1+p-1,Q))}$$

equal.

It is advantageous to set values for $X_{n_i}$, $$X_{(\frac{M}{2}+P_1+mod(-n_i+P_1+p-1,Q))},$$

$Y_{n_i}$ and $$Y_{(\frac{M}{2}+P_1+mod(-n_i+P_1+p-1,Q))}$$

with $i \in [\![1;L]\!]$, such as the maximum absolute values modules are equal or smaller than the maximum absolute values of the modulation symbols of the digital modulation scheme used for modulation. For example, the digital modulation scheme can be QPSK (quadrature phase-shift keying) or other PSK (phase-shift keying) whose values are all of module equal to 1, in this example the values of $|X_{n_i}|$, $$\left|X_{(\frac{M}{2}+P_1+mod(-n_i+P_1+p-1,Q))}\right|,$$

$|Y_{n_i}|$ and $$\left|Y_{\left(\frac{M}{2}+P_1+mod(-n_i+P_1+p-1,Q)\right)}\right|$$

are chosen as to be smaller or equal to 1.

Referring to FIG. 4.3, there is shown a block diagram of post-IDFT insertion of reference signals according to the invention. In this embodiment, the reference signals are not inserted pre-DFT (that is by setting the values of the symbols $X_{n_i}$ and $$X_{\left(\frac{M}{2}+P_1+mod(-n_i+P_1+p-1,Q)\right)}$$

with i∈〚1;L〛, to non-null values known by the receiver as shown in FIG. 4.1). The insertion of the reference signals is done post IDFT. For this, the data modulator module 4.14 is configured to set the values of the symbols $X_{n_i}$ and $$X_{\left(\frac{M}{2}+P_1+mod(-n_i+P_1+p-1,Q)\right)}$$

with i∈〚1;L〛 to 0 before applying the modified SS-STBC pre-coder 4.2. The configuration of the data modulator module 4.14 may be made by the RS insertion module 4.13 which can send the position configuration to the data modulator module 4.14. On this incomplete block of symbols $X_{DATA}$, the SS-STBC scheme as in the embodiment of FIG. 4.1 is applied, starting by the SS-STBC pre-coder 4.2, the M-size DFTs 4.3 and 4.4. At the respective IDFT outputs subsequent signals are obtained, that is $\tilde{x}_{DATA}^{Tx1}$ at the output of the IDFT module 4.7 corresponding to the antenna Tx1 and $\tilde{x}_{DATA}^{Tx2}$ at the output of the IDFT module 4.8 corresponding to the antenna Tx2. The RS insertion module 4.13 adds respectively to each of the output signals of the IDFT modules (4.7 and 4.8), which are $\tilde{x}_{DATA}^{Tx1}$ corresponding to the antenna Tx1 and $\tilde{x}_{DATA}^{Tx2}$ corresponding to the antenna Tx2, the signals $\tilde{x}_{DATA}^{Tx1}$ and the signal $\tilde{x}_{DATA}^{Tx2}$ respectively. The signal $\tilde{x}_{DATA}^{Tx1}$ and $\tilde{x}_{DATA}^{Tx2}$ are pre-computed samples of the corresponding, symbols $X_{n_i}$, $$X_{\left(\frac{M}{2}+P_1+mod(-n_i+P_1+p-1,Q)\right)},$$

$Y_{n_i}$ and $$Y_{\left(\frac{M}{2}+P_1+mod(-n_i+P_1+p-1,Q)\right)}$$

with i∈〚1;L〛. That is rather than setting the post pre-coder values of the symbols $X_{n_i}$, $$X_{\left(\frac{M}{2}+P_1+mod(-n_i+P_1+p-1,Q)\right)},$$

$Y_{n_i}$ and $$Y_{\left(\frac{M}{2}+P_1+mod(-n_i+P_1+p-1,Q)\right)}$$

with i∈〚1;L〛 in the first and second block of symbols (X and Y), the samples of the reference signals are previously computed to obtain samples identical or at least equivalent to those that would have been obtain, at the output of the IDFT, for example by setting the values (post pre-coder) of the symbols $X_{n_i}$, $$X_{\left(\frac{M}{2}+P_1+mod(-n_i+P_1+p-1,Q)\right)},$$

$Y_{n_i}$ and $$Y_{\left(\frac{M}{2}+P_1+mod(-n_i+P_1+p-1,Q)\right)}$$

with i∈〚1;L〛 to non-null values known by the receiver, as previously described. For example, $\tilde{x}_{DATA}^{Tx1}$ can be obtained by applying SC-FDMA schemes to a first block of symbols where the values of the symbols $X_{n_i}$ and $$X_{\left(\frac{M}{2}+P_1+mod(-n_i+P_1+p-1,Q)\right)}$$

with i∈〚1;L〛 are set respectively to the values representing the first and second reference signals and setting the values of the other symbols to 0 (that is by not introducing other symbols). $\tilde{x}_{RS}^{Tx2}$ can be obtained by applying SC-FDMA schemes to a second block of symbols where the values of the symbols $Y_{n_i}$ and $$Y_{\left(\frac{M}{2}+P_1+mod(-n_i+P_1+p-1,Q)\right)}$$

with i∈〚1;L〛 are set respectively to the values representing the fourth and third reference signals and setting the values of the other symbols to 0 (that is by not introducing other symbols).

In the embodiments of the FIG. 4.3 where the reference signals are inserted post-IDFT the signals obtained at the output of the adders, $\tilde{x}^{Tx1}$ and $\tilde{x}^{Tx2}$, are equivalent to the signals at the outputs of the IDFT modules when post pre-coder inserting the reference signals. Therefore, all the features shown in relation with post pre-coder insertion or pre-DFT insertion can be applied to post-IDFT insertion.

Before adding the signal $\tilde{x}_{RS}^{Tx1}$ and the signal $\tilde{x}_{RS}^{Tx2}$, it is advantageous to filter the signals $\tilde{x}_{DATA}^{Tx1}$ and $\tilde{x}_{DATA}^{Tx2}$ to ensure that the samples in the signal $\tilde{x}_{DATA}^{Tx1}$ and the signal $\tilde{x}_{DATA}^{Tx2}$ of the corresponding symbols $X_{n_i}$, $$X_{\left(\frac{M}{2}+P_1+mod(-n_i+P_1+p-1,Q)\right)},$$

$Y_{n_i}$ and $$Y_{(\frac{M}{2}+P_1+mod(-n_i+P_1+p-1,Q))},$$

whose values have been set to 0, are also strictly equal to 0 for the time periods in which are inserted the samples of the reference signal or at least time periods in which are inserted the parts of the samples of high energy. Therefore, this enables to reduce the interference of signals $\tilde{x}_{DATA}^{Tx1}$ and $\tilde{x}_{DATA}^{Tx2}$ onto at least the high energy part of signals $\tilde{x}_{RS}^{Tx1}$ and $\tilde{x}_{RS}^{Tx2}$.

Figure 5:
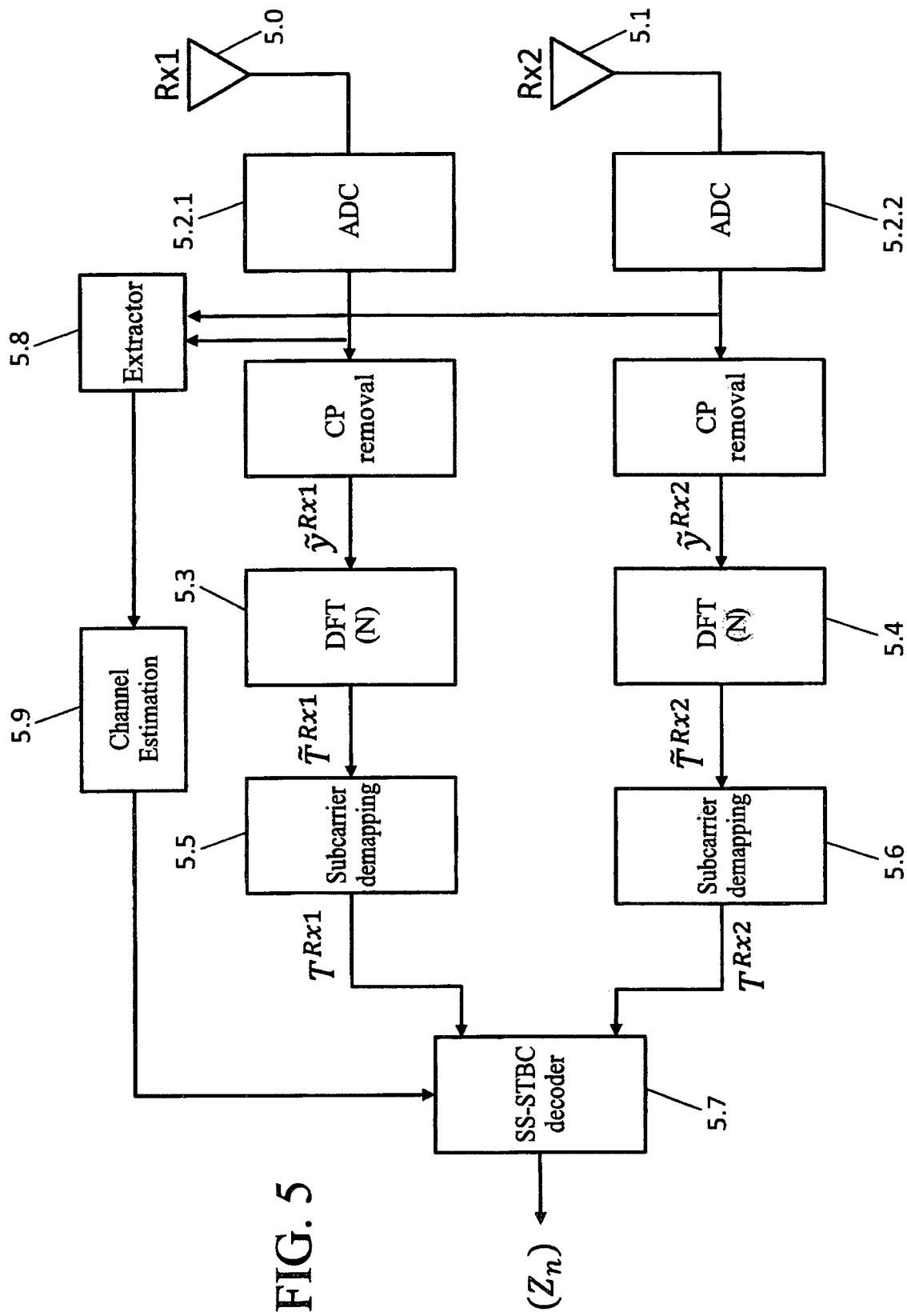
FIG. 5 schematizes a block diagram of RS extraction and DATA decoding according to the invention.

Referring to FIG. 5, there is shown a block diagram of reference signals extraction according to the invention. The radio signal emitted according to the previous embodiments is received by the receiver 1.2, after having crossed a multipath channel and suffered noise and phase noise effects. The receiver can receive the radio signal on one antenna, which is the case in MISO telecommunication system, or on several antennas Rx1, Rx2 as shown in FIG. 5.

After the Analogue to Digital converters (ADC) have been applied to the radio signal received by each antenna, the reference signals are extracted. In a variant, reference signals can be extracted after CP removal. Here, by reference signal extraction we understand separating time domain portions of the received radio signal containing part or all of the information relative to the sent reference signals, corrupted by the channel and the noise/phase noise during the transmission process.

As previously explained this is possible since, in the time domain, samples in the radio signal of the reference signals are superposed, and no parts of high energy samples corresponding to non-reference signals symbols are emitted at the same time of the high energy superposed samples of the reference signals.

Therefore, by extracting the parts of the signals outputted by the ADCs 5.2.1 and 5.2.2 during the time periods dependent to the position $n_i$ (which are the same than time periods dependent to the position $$\frac{M}{2}+P_1+mod(-n_i+P_1+p-1,Q)$$

due to the SS-STBC pre-coder scheme), the received samples corresponding to the symbols $X_{n_i}$, $$X_{(\frac{M}{2}+P_1+mod(-n_i+P_1+p-1,Q))},$$

$Y_{n_i}$ and $$Y_{(\frac{M}{2}+P_1+mod(-n_i+P_1+p-1,Q))}$$

are extracted. It is advantageous to take into account only the time periods corresponding to parts of the samples with high energy to avoid extracting unusable samples. These time periods depend on the type of subcarrier mapping that is implemented. For example a localized or a distributed implementation give completely different time periods.

Each type of subcarrier mapping has its own distribution, across the time domain, of the samples in the radio signal. These distribution are well known by the person skilled in the art and shown in the literature (for example: Cf. reference Hyung G. Myung Single Carrier Orthogonal Multiple Access Technique for Broadband Wireless Communications Ph.D. Thesis Defense|2006 Dec. 18) which can easily transpose the teaching of the invention to other subcarrier mapping, thus the invention is not limited to a specific subcarrier mapping.

The extractor 5.8 may be configured to apply time-domain windows for extracting the reference signals according to the time periods of the received samples of the reference signals inserted (pre-DFT, post pre-decoder or post-DFT). A first configuration is to apply time domain windows, each window being equal to one time period among the time periods corresponding to the receiving of the samples of the reference signals (that is the time periods of the received samples of the reference signals). The sizes of the windows may as well slightly exceed the size of the windows of the first configuration each window being positioned to include a window of the first configuration. This enables to extract a slightly wider part of the received samples corresponding to the reference signals which is advantageous when the receiver 1.2 is capable of interference mitigation. The size of the windows may be taken slightly smaller than the size of the windows of the first configuration and each window may be positioned to be included in a window of the first configuration, enabling to limit the extraction of the received samples of non-reference signals which may cause interference with the samples of the reference signal, which is advantageous when the receiver 1.2 is of low performance regarding interference mitigation.

Once the received samples of the reference signals are extracted by the extractor 5.8 they may be time domain or frequency domain processed. The processing of the samples of the reference signals is a common processing well known by the person skilled in the art. For example, reference signals can serve as base for channel estimation through known channel estimation methods applied in the time or in the frequency domain. For example, reference signals can serve to improve the quality of a channel estimate acquired based on other dedicated reference signals (e.g. dedicated SC-FDMA symbols carrying only reference symbols such as DMRS). Once the received samples of the reference signals are processed, the channel estimation module 5.9 can compare these reference signals with reference values, as part of the channel estimation process.

The channel estimation may also result from a classical implementation with dedicated DMRS (demodulation reference signal) which occupy a full block of symbols, in this case the reference signal according to the invention can be used to improve the channel estimation quality.

Once the channel estimation module 5.9 calculated the estimated channel, the SS-STBC decoder 5.7 may be set to compensate the corruption (phase shift, amplitude . . . ) of the signal in the channel between transmitter and receiver. Enabling to enhance the performance of the processing to obtain the block of symbols $Z=(Z_0, \ldots Z_{M-1})$.

The extractor 5.8 can also be placed after the guard removal modules.

Referring to FIG. 6.1 there is shown a flowchart representing the steps of pre-DFT inserting reference signals in a radio signal according to the invention.

At step S11 the RS insertion module 4.9 is configured either in a static way or dynamically (that is that the RS insertion module 4.9 is reconfigured depending for example on a feedback from the receiver through a control channel), or by a combination of the two. In the case of a dynamic configuration the RS insertion module 4.9 may choose another configuration upon those saved in the MEMO_trans 1.5. Indeed, several configurations may be pre-parametered in the RS insertion module 4.9, those configurations can be ordered according to the number of reference signals the configuration provides. A configuration may be defined by the number of quadruplets of reference signals K or L, by the positions $n_i$ in the block of symbols X of the symbols $X_{n_i}$ to which corresponds the different reference signals to be inserted.

RS insertion module 4.9 may inform the Data modulator module 4.10 of the chosen configuration. Enabling the Data modulator module 4.10 to insert modulation symbols into the block of symbols in positions that do not conflict with the positions $n_i$ or $n_i+M/2$ with $i \in [\![1;L]\!]$ of the reference signals.

At step S12 the RS insertion module 4.9, inserts the reference signals as previously described, by setting each value of the symbols $X_n$ which are at positions $n_i$ or $n_i+M/2$ with $i \in [\![1;L]\!]$ at a value of a reference signal.

At step S13 the signal is processed, that is on the block of symbols $X=(X_0, \ldots X_{M-1})$ is applied the modified SS-STBC scheme (SS-STBC pre-coder 4.2, DFT modules 4.3 and 4.4, subcarrier mapping modules 4.5 and 4.6, IDFT modules 4.7 and 4.8).

At step S14 the signal is emitted by Tx1 4.0 and Tx2 4.1.

Referring to FIG. 6.2 there is shown a flowchart representing the steps of post pre-coder inserting reference signals in a radio signal according to the invention.

At step S21 the RS insertion module 4.11 may be configured in a static way or dynamically as in FIG. 6.1 (or by a combination of the two). Several configurations may also be pre-parametered in the RS insertion module 4.11, those configurations can be ordered according to the number of reference signals the configuration provides. A configuration may be defined by the number of quadruplets of reference signals K, by the positions $n_i$ in the blocks of symbols X and Y in which the different reference signals are inserted. When configured, the RS insertion module 4.11 may inform the Data modulator module 4.12 of the configuration chosen.

At step S22, based on the configuration of the RS insertion module 4.11, the Data modulator module 4.12 sets the values of the symbols $X_{n_i}$ and $X_{(n_i+M/2)}$ with $i \in [\![1;L]\!]$ to 0, as previously described in FIG. 4.2.

At step S23, the SS-STBC pre-coder 4.2 is applied on the incomplete block of symbols $X_{DATA}$, as previously explained in FIG. 4.2.

At step S24 the RS insertion module 4.11 inserts the reference signals by setting the values of the symbols $X_{n_i}$, $$X_{\frac{M}{2}+P_1+mod(-n_i+P_1+p-1,Q)},$$

$Y_{n_i}$ and $$Y_{\frac{M}{2}+P_1+mod(-n_i+P_1+p-1,Q)},$$

of the incomplete block of symbols $X_{DATA}$ and of the block of symbols $Y_{DATA}$ obtained at the output of the pre-coder 4.2, to values representing the first, second, fourth and third reference signals respectively.

At step S25 the signal is processed, that is on each of the blocks of symbols X and Y, to which the reference signals have been inserted, the SC-FDMA scheme is applied (DFT modules 4.3 and 4.4, subcarrier mapping modules 4.5 and 4.6, IDFT modules 4.7 and 4.8) is applied.

At step S26 the signal is emitted by Tx1 4.0 and Tx2 4.1.

Referring to FIG. 6.3 there is shown a flowchart representing the steps of post-IDFT inserting reference signals in a radio signal according to the invention.

At step S31 the RS insertion module 4.13 may also be configured in a static way or dynamically as in FIG. 5.1 (or by a combination of the two). Several configurations may also be pre-parametered in the RS insertion module 4.13, those configurations can be ordered according to the number of reference signals the configuration provides. A configuration may be defined by the number of quadruplets of reference signals K, by the positions $n_i$ in the block of symbols X in which the different reference signals are inserted. When configured, the RS insertion module 4.13 may inform the Data modulator module 4.14 of the configuration chosen.

At step S32, based on the configuration of the RS insertion module 4.13, the Data modulator module 4.14 sets the values of the symbols $X_{n_i}$ and $X_{(n_i+M/2)}$ with $i \in [\![1;L]\!]$ to 0, as previously described in FIG. 4.3.

At step S33 the signal is processed, that is on the block of symbols $X=(X_0, \ldots X_{M-1})$, to which the values of the symbols $X_{n_i}$ and $X_{(n_i+M/2)}$ with $i \in [\![1;L]\!]$ have been set to 0, is applied a SS-STBC type scheme (SS-STBC pre-coder 4.2, DFT modules 4.3 and 4.4, subcarrier mapping modules 4.5 and 4.6, IDFT modules 4.7 and 4.8).

At step S34 the RS insertion module 4.13 adds respectively to each of the output signals of the IDFT modules (4.7 and 4.8), which are $\tilde{x}_{DATA}^{Tx1}$ corresponding to the antenna Tx1 4.0 and $\tilde{x}_{DATA}^{Tx2}$ corresponding to the antenna Tx2 4.1, the signal $\tilde{x}_{RS}^{Tx1}$ and the signal $\tilde{x}_{RS}^{Tx2}$. The signal $\tilde{x}_{RS}^{Tx1}$ and $\tilde{x}_{RS}^{Tx2}$ may be computed as previously mentioned in FIG. 4.3.

At step S35 the signal is emitted by Tx1 4.0 and Tx2 4.1.

Referring to FIG. 7 there is shown a flowchart representing the steps of extracting reference signals in the radio signal according to the invention.

At step S71 the extractor 5.8 is configured according to the configuration of the RS insertion module (4.9, 4.11 or 4.13). The same configurations pre-parametered in the RS insertion module (4.9, 4.11 or 4.13) may be pre-parametered in the extractor 5.8. The transmitter 1.1 can optionally send control information to the receiver 1.2 through a control channel, this control information pointing the configuration to set for extracting the reference signal being sent by the transmitter.

At step S72 the extractor 5.8 extracts parts of the signals outputted by the ADCs 5.2.1 and 5.2.2 during the time periods corresponding with the received samples of the reference signals. The extraction is conduct as described in FIG. 5.

At step S73 the samples of the reference signals are processed as previously described.

At step S74 the channel estimation module 5.9 compares these reference signals with reference values, that is the corresponding values of the emitted samples of the reference signals, to obtain a channel estimation quality. The channel estimation module 5.9 may also specify a previously obtained channel estimation quality.

At step S75 the signal received is then processed, using the channel estimation quality to enhance the performance of the processing. For example the SS-STBC decoder 5.7 may be set to compensate the corruption (phase shift, amplitude . . . ) of the signal in the channel between transmitter and receiver.

The invention claimed is:

1. A method for inserting K quadruplets of a first, a second, a third and a fourth Reference Signals in a radio signal to be transmitted over a wireless communication system, said radio signal being emitted by an emitter comprising at least two transmit antennas, each transmit antenna being configured for transmitting on at least an even number M, strictly greater than 1, of different frequencies, and K being a strictly positive integer smaller than or equal to M/2, said radio signal being provided by:

applying a first block of M symbols $X=(X_0, \ldots X_{M-1})$ to a precoder to obtain a second block of M symbols $Y=(Y_0, \ldots Y_{M-1})$, with $$Y_k = \begin{cases} \varepsilon X^*_{\frac{M}{2}+P_1+mod(-k+P_1+p-1,Q)}, & \text{for } k \in [\![P_1; \frac{M}{2}-P_2[\![ \\ -\varepsilon X^*_{P_1+mod(-k+P_1+\frac{M}{2}+p-1,Q)}, & \text{for } k \in [\![\frac{M}{2}+P_1; M-P_2[\![ \end{cases},$$

with $P_1$ and $P_2$ predefined positive integers, such as $P_1+P_2$ is strictly smaller than M/2, p is a predefined integer, Q is a positive integer smaller than M/2, and $\varepsilon$ is 1 or −1 and $X_k^*$ being the complex conjugate of $X_k$;

applying at least a M size DFT then a N size IDFT corresponding to a first transmit antenna, to the first block of M symbols to obtain a first single-carrier frequency division multiple access, SC-FDMA, symbol representing the first block of M symbols, said first SC-FDMA symbol being of a given duration;

applying at least a M size DFT then a N size IDFT corresponding to a second transmit antenna, to the second block of M symbols to obtain a second single-carrier frequency division multiple access, SC-FDMA, symbol representing the second block of M symbols, said second SC-FDMA symbol being of the given duration;

transmitting during a time interval of the given duration, respectively on the first and second transmit antennas, simultaneously the first and second SC-FDMA symbols, into the radio signal;

said method comprising:

determining a number L smaller than or equal to $\min(M/2-P_1-P_2; K)$ of integers such as $$\{n_i \mid i \in [\![1;L]\!], P_1 \leq n_i < \frac{M}{2}-P_2, \forall\, i,j \in [\![1;L]\!]^2, i<j \Rightarrow n_i<n_j\};$$

and for each i-th quadruplet out of L quadruplets of a first, a second, a third and a fourth Reference Signals among the K quadruplets:

inserting the first Reference Signal such as samples of the first Reference Signal are in positions in the first SC-FDMA symbol dependent on a position $n_i$ of the symbol $X_{n_i}$ in the first block of M symbols;

inserting the second Reference Signal such as samples of the second Reference Signal are in positions in the first SC-FDMA symbol dependent on the position $$\frac{M}{2}+P_1+\mathrm{mod}(-n_i+P_1+p-1, Q)$$

of the symbol $$X_{\frac{M}{2}+P_1+mod(-n_i+P_1+p-1,Q)}$$

in the first block of M symbols;

inserting the third Reference Signal such as samples of the third Reference Signal are in positions in the second SC-FDMA symbol dependent on a position $n_i$ of the symbol $X_{n_i}$ in the first block of M symbols;

inserting the fourth Reference Signal such as samples of the fourth Reference Signal are in positions in the second SC-FDMA symbol dependent on the position $$\frac{M}{2}+P_1+\mathrm{mod}(-n_i+P_1+p-1, Q)$$

of the symbol $$X_{\frac{M}{2}+P_1+mod(-n_i+P_1+p-1,Q)}$$

in the first block of M symbols.

2. The method according to claim 1, wherein for each quadruplet i, inserting the first, second, third and fourth Reference Signals is done by setting values of symbol $X_{n_i}$ and symbol $$X_{\frac{M}{2}+P_1+mod(-n_i+P_1+p-1,Q)}$$

to respectively values representing the first and second Reference Signals of quadruplet i, before applying the precoder and the M size DFT corresponding to the first transmit antenna to the first block of M symbols.

3. The method according to claim 1, wherein for each quadruplet i, said method further comprises:

setting the values of the symbol $X_{n_i}$ and of the symbol $$X_{\frac{M}{2}+P_1+mod(-n_i+P_1+p-1,Q)}$$

to 0, with $i \in [\![1;L]\!]$, before applying the precoder to the first block of M symbols;

inserting the first, second, third and fourth Reference Signals is done by:

setting values of symbol $X_{n_i}$ and symbol $$X_{\frac{M}{2}+P_1+mod(-n_i+P_1+p-1,Q)}$$

to respectively values representing the first and second Reference Signals of quadruplet i, after applying the precoder to the first block of M symbols and before applying the M size DFT corresponding to the first transmit antenna to the first block of M symbols;

setting values of symbol $Y_{n_i}$ and symbol $$Y_{\frac{M}{2}+P_1+mod(-n_i+P_1+p-1,Q)}$$

to respectively values representing fourth and third Reference Signals of quadruplet i, before applying the M size DFT corresponding to the second transmit antenna to the second block.

4. The method according to claim 1, wherein for each quadruplet i, said method further comprises:
setting the values of the symbol $X_{n_i}$ and of the symbol $$X_{\frac{M}{2}+P_1+mod(-n_i+P_1+p-1,Q)}$$

to 0, with $i \in [\![1;L]\!]$, before applying the precoder and the M size DFT to the first block of M symbols;
inserting the first, second, third and fourth Reference Signals is done by:
adding samples of the first Reference Signal and samples of the second Reference Signal to an output signal of the N size IDFT corresponding to the first transmit antenna, to obtain the first SC-FDMA symbol;
adding samples of the third Reference Signal and samples of the fourth Reference Signal to an output signal of the N size IDFT corresponding to the second transmit antenna, to obtain the second SC-FDMA symbol.

5. The method according to claim 4, said method further comprising to set the output signal of the N size IDFT corresponding to the first transmit antenna to 0 at least during a time period corresponding to one of the positions in the first SC-FDMA symbol dependent on the position $n_i$ of the symbol $X_{n_i}$ and/or the position $$\frac{M}{2} + P_1 + \mod(-n_i + P_1 + p - 1, Q)$$

of the symbol $$X_{\frac{M}{2}+P_1+mod(-n_i+P_1+p-1,Q)}$$

in the first block of M symbols; and/or
to set the output signal of the N size IDFT corresponding to the second transmit antenna to 0 at least during a time period corresponding to one of the positions in the second SC-FDMA symbol dependent on the position $n_i$ of the symbol $X_{n_i}$ and/or the position $$\frac{M}{2} + P_1 + \mod(-n_i + P_1 + p - 1, Q)$$

of the symbol $$X_{\frac{M}{2}+P_1+mod(-n_i+P_1+p-1,Q)}$$

in the first block of M symbols,
for at least one $i \in [\![1;L]\!]$ before inserting the first, second, third and fourth Reference Signals of quadruplet i.

6. The method according to claim 1, said method further comprising determining:
a number H of pairs of positive integers $k_l$ and $k'_l$ with $l \in [\![1;H]\!]$, with H strictly greater than 1, such as:

$$k_1 = 1, k'_H = L,$$

$$\forall l \in [\![1;H-1]\!], k_l < k'_l < k_{l+1} < k'_{l+1},$$

a positive integer d strictly greater than 1;
the L integers $n_i$, with $i \in [\![1;L]\!]$ such as:

$$\forall l \in [\![1;L-1]\!], n_{k_{l+1}} - n_{k'_l} \geq d$$

$$\forall l \in [\![1;L]\!], n_{k'_l} - n_{k_l} = k'_l - k_l.$$

7. The method according to claim 1, said method further comprising determining:
a positive integer d strictly greater than 1;
the L integers $n_i$, with $i \in [\![1;L]\!]$ such as:

$$n_{i+1} - n_i \geq d.$$

8. The method according to claim 1, wherein $n_L - n_1 = L - 1$.
9. The method according to claim 1,
wherein a value $\rho_{n_i}$, such as the samples in the first SC-FDMA symbol that are obtained from the symbol $X_{n_i}$ whose value is set to $\rho_{n_i}$ are equal to the samples of the first reference signal of quadruplet i in the first SC-FDMA symbol, is a component of a CAZAC sequence; and/or
wherein a value $$\rho_{\frac{M}{2}+P_1+mod(-n_i+P_1+p-1,Q)},$$

such as the samples in the first SC-FDMA symbol that are obtained from the symbol $$X_{\frac{M}{2}+P_1+mod(-n_i+P_1+p-1,Q)}$$

whose value is set to $$\rho_{\frac{M}{2}+P_1+mod(-n_i+P_1+p-1,Q)}$$

are equal to the samples of the second reference signal of quadruplet i in the first SC-FDMA symbol, is a component of a CAZAC sequence; and/or
wherein a value $$\rho'_{\frac{M}{2}+P_1+mod(-n_i+P_1+p-1,Q)},$$

such as use samples in the second SC-FDMA symbol that are obtained from the symbol $$Y_{\frac{M}{2}+P_1+mod(-n_i+P_1+p-1,Q)}$$

whose value is set to $$\rho'_{\frac{M}{2}+P_1+mod(-n_i+P_1+p-1,Q)}$$

are equal to the samples of the third reference signal of quadruplet i in the second SC-FDMA symbol, is a component of a CAZAC sequence; and/or
wherein a value $\rho'_{n_i}$, such as the samples in the second SC-FDMA symbol that are obtained from the symbol $Y_{n_i}$ whose value is set to $\rho'_{n_i}$ are equal to the samples of the fourth reference signal of quadruplet i in the second SC-FDMA symbol, is a component of a CAZAC sequence.

10. The method according to claim 1,
wherein a value $\rho_{n_i}$, such as the samples in the first SC-FDMA symbol that are obtained from the symbol $X_{n_i}$ whose value is set to $\rho_{n_i}$ are equal to the samples of the first reference signal of quadruplet i in the first SC-FDMA symbol, is equal to a value $$\rho_{\frac{M}{2}+P_1+mod(-n_i+P_1+p-1,Q)},$$

such as the samples in the first SC-FDMA symbol that are obtained from the symbol $$X_{\frac{M}{2}+P_1+mod(-n_i+P_1+p-1,Q)}$$

whose value is set to $$\rho_{\frac{M}{2}+P_1+mod(-n_i+P_1+p-1,Q)}$$

are equal to the samples of the second reference signal of quadruplet i in the first SC-FDMA symbol; and/or
wherein a value $$\rho'_{\frac{M}{2}+P_1+mod(-n_i+P_1+p-1,Q)},$$

such as the samples in the second SC-FDMA symbol that are obtained from the symbol $$Y_{\frac{M}{2}+P_1+mod(-n_i+P_1+p-1,Q)}$$

whose value is set to $$\rho'_{\frac{M}{2}+P_1+mod(-n_i+P_1+p-1,Q)}$$

equal to the samples of the third reference signal of quadruplet i in the second SC-FDMA symbol, is equal to a value $\rho'_{n_i}$, such as the samples in the second SC-FDMA symbol that are obtained from the symbol $Y_{n_i}$ whose value is set to $\rho'_{n_i}$ are equal to the samples of the fourth reference signal of quadruplet i in the second SC-FDMA symbol.

11. The method according to claim 1,
wherein a value $\rho_{n_i}$, such as the samples in the first SC-FDMA symbol that are obtained from the symbol $X_{n_i}$ whose value is set to $\rho_{n_i}$ are equal to the samples of the first reference signal of quadruplet i in the first SC-FDMA symbol, is equal to a value $\rho'_{n_i}$, such as the samples in the second SC-FDMA symbol that are obtained from the symbol $Y_{n_i}$ whose value is set to $\rho'_{n_i}$ are equal to the samples of the fourth reference signal of quadruplet i in the second SC-FDMA symbol; and/or
wherein a value $$\rho_{\frac{M}{2}+P_1+mod(-n_i+P_1+p-1,Q)},$$

such as the samples in the first SC-FDMA symbol that are obtained from the symbol $$X_{\frac{M}{2}+P_1+mod(-n_i+P_1+p-1,Q)}$$

who value is set to $$\rho_{\frac{M}{2}+P_1+mod(-n_i+P_1+p-1,Q)}$$

are equal to the samples of the second reference signal of quadruplet i in the first SC-FDMA symbol, is equal to a value $$\rho'_{\frac{M}{2}+P_1+mod(-n_i+P_1+p-1,Q)},$$

such as the samples in the second SC-FDMA symbol that are obtained from the symbol $$Y_{\frac{M}{2}+P_1+mod(-n_i+P_1+p-1,Q)}$$

whose value is set to $$\rho'_{\frac{M}{2}+P_1+mod(-n_i+P_1+p-1,Q)}$$

are equal to the samples of the third reference signal of quadruplet i in the second SC-FDMA symbol.

12. The method according to claim 1, wherein a maximum module among modules of values $\rho_{n_i}$, $$\rho_{\frac{M}{2}+P_1+mod(-n_i+P_1+p-1,Q)},\ \rho'_{\frac{M}{2}+P_1+mod(-n_i+P_1+p-1,Q)})$$

and $\rho'_{n_i}$ with $i \in [\![1;L]\!]$, is equal to or smaller than a maximum module among modules of modulation symbols of a digital modulation scheme used to obtain said block of symbols,
with $\rho_{n_i}$ such as the samples in the first SC-FDMA symbol that are obtained from the symbol $X_{n_i}$ whose value is set to $\rho_{n_i}$ are equal to the samples of the first reference signal of quadruplet i in the first SC-FDMA symbol, and $$\rho_{\frac{M}{2}+P_1+mod(-n_i+P_1+p-1,Q)}$$

such as the samples in the first SC-FDMA symbol that are obtained from the symbol $$X_{\frac{M}{2}+P_1+mod(-n_i+P_1+p-1,Q)}$$

whose value is set to $$\rho_{\frac{M}{2}+P_1+mod(-n_i+P_1+p-1,Q)}$$

are equal to the samples of the second reference signal of quadruplet i in the first SC-FDMA symbol, and $$\rho'_{(\frac{M}{2}+P_1+mod(-n_i+P_1+p-1,Q)}$$

such as the samples in the second SC-FDMA symbol that are obtained from the symbol $$Y_{\frac{M}{2}+P_1+mod(-n_i+P_1+p-1,Q)}$$

whose value is set to $$\rho'_{\frac{M}{2}+P_1+mod(-n_i+P_1+p-1,Q)}$$

are equal to the samples of the third reference signal of quadruplet i in the second SC-FDMA symbol, and $\rho'_{n_i}$ such as the samples in the second SC-FDMA symbol that are obtained from the symbol $Y_{n_i}$ whose value is set to $\rho'_{n_i}$ are equal to the samples of the fourth reference signal of quadruplet i in the second SC-FDMA symbol.

13. The method according to claim 1, wherein a value $\rho_i$, such as the samples in the first SC-FDMA symbol are obtained from the symbol $X_n$ whose value is set to $\rho_n$, $\rho_n$ being:

equal to a value $\rho_{n+Q}$, such as the samples in the first SC-FDMA symbol are obtained from the symbol $X_{n+Q}$ whose value is set to $\rho_{n+Q}$, if $n \in [\![ 0; P_1-1 ]\!] \cup [\![ M/2; M/2+P_1-1 ]\!]$ ;

equal to a value $\rho_{n-Q}$ such as the samples in the first SC-FDMA symbol are obtained from the symbol $X_{n-Q}$ whose value is set to $\rho_{n-Q}$, if $$n \in [\![ \frac{M}{2} - P_2; \frac{M}{2} - 1 ]\!] \cup [\![ M - P_2; M - 1 ]\!];$$

and/or
a value $\rho'_n$, such as the samples in the second SC-FDMA symbol are obtained from the symbol $Y_n$ whose value is set to $\rho'_n$, $\rho'_n$ being:

equal to a value $\rho'_{n+Q}$, such as the samples in the second SC-FDMA symbol are obtained from the symbol $X_{n+Q}$ whose value is set to $\rho'_{n+Q}$, if $n \in [\![ 0; P_1-1 ]\!] \cup [\![ M/2; M/2+P_1-1 ]\!]$ ;

equal to a value $\rho'_{n-Q}$, such as the samples in the second SC-FDMA symbol are obtained from the symbol $X_{n-Q}$ whose value is set to $\rho'_{n-Q}$, if $$n \in [\![ \frac{M}{2} - P_2; \frac{M}{2} - 1 ]\!] \cup [\![ M - P_2; M - 1 ]\!].$$

14. A non-transitory computer readable medium having stored thereon a computer program product comprising code instructions that when executed by at least a processor cause the processor to perform a method for inserting K quadruplets of a first, a second, a third and a fourth Reference Signals in a radio signal to be transmitted over a wireless communication system, said radio signal being emitted by an emitter comprising at least two transmit antennas, each transmit antenna being configured for transmitting on at least an even number M, strictly greater than 1, of different frequencies, and K being a strictly positive integer smaller than or equal to M/2, said radio signal being provided by:

applying a first block of M symbols $X=(X_0, \ldots X_{M-1})$ to a precoder to obtain a second block of M symbols $Y=(Y_0, \ldots Y_{M-1})$, with $$Y_k = \begin{cases} \varepsilon X^*_{\frac{M}{2}+P_1+mod(-k+P_1+p-1,Q)}, & \text{for } k \in [\![ P_1; \frac{M}{2} - P_2 [\![ \\ -\varepsilon X^*_{P_1+mod(-k+P_1+\frac{M}{2}+p-1,Q)}, & \text{for } k \in [\![ \frac{M}{2} + P_1; M - P_2 [\![ \end{cases},$$

with $P_1$ and $P_2$ predefined positive integers, such as $P_1+P_2$ is strictly smaller than M/2, p a predefined integer, Q is a positive integer smaller than M/2, and $\varepsilon$ is 1 or −1 and $X_k^*$ being the complex conjugate of $X_k$;

applying at least a M size DFT then a N size IDFT corresponding to a first transmit antenna, to the first block of M symbols to obtain a first single-carrier frequency division multiple access, SC-FDMA, symbol representing the first block of M symbols, said first SC-FDMA symbol being of a given duration;

applying at least a M size DFT then a N size IDFT corresponding to a second transmit antenna, to the second block of M symbols to obtain a second single-carrier frequency division multiple access, SC-FDMA, symbol representing the second block of M symbols, said second SC-FDMA symbol being of the given duration;

transmitting during a time interval of the given duration, respectively on the first and second transmit antennas, simultaneously the first and second SC-FDMA symbols, into the radio signal;

said method comprising:
determining a number L smaller than or equal to min(M/2−$P_1$−$P_2$; K) of integers such as $$\{n_i \mid i \in [\![ 1; L ]\!], P_1 \leq n_i < \frac{M}{2} - P_2, \forall i, j \in [\![ 1; L ]\!]^2, i < j \Rightarrow n_i < n_j\};$$

and for each i-th quadruplet out of L quadruplets of a first, a second, a third and a fourth Reference Signals among the K quadruplets:

inserting the first Reference Signal such as samples of the first Reference Signal are in positions in the first SC-FDMA symbol dependent on a position $n_i$ of the symbol $X_{n_i}$ in the first block of M symbols;

inserting the second Reference Signal such as samples of the second Reference Signal are in positions in the first SC-FDMA symbol dependent on the position $$\frac{M}{2} + P_1 + \mod(-n_i + P_1 + p - 1, Q)$$

of the symbol $$X_{\frac{M}{2}+P_1+mod(-n_i+P_1+p-1,Q)}$$

in the first block of M symbols;

inserting the third Reference Signal such as samples of the third Reference Signal are in positions in the second SC-FDMA symbol dependent on a position $n_i$ of the symbol $X_{n_i}$ in the first block of M symbols;

inserting the fourth Reference Signal such as samples of the fourth Reference Signal are in positions in the second SC-FDMA symbol dependent on the position $$\frac{M}{2} + P_1 + \mod(-n_i + P_1 + p - 1, Q)$$

of the symbol $$X_{\frac{M}{2}+P_1+mod(-n_i+P_1+p-1,Q)}$$

in the first block of M symbols.

15. A device for inserting K quadruplets of a first, a second, a third and a fourth Reference Signals in a radio signal to be transmitted over a wireless communication system, said radio signal being emitted by an emitter comprising at least two transmit antennas, each transmit antenna being configured for transmitting on at least an even number M, strictly greater than 1, of different frequencies, and K being a strictly positive smaller than or equal to M/2, said radio signal being processed by:

applying a first block of M symbols $X=(X_0, \ldots X_{M-1})$ to a precoder to obtain a second block of M symbols $Y=(Y_0, \ldots Y_{M-1})$, with $$Y_k = \begin{cases} \varepsilon X^*_{\frac{M}{2}+P_1+mod(-k+P_1+p-1,Q)}, & \text{for } k \in [\![P_1; \frac{M}{2} - P_2[\![ \\ -\varepsilon X^*_{P_1+mod(-k+P_1+\frac{M}{2}+p-1,Q)}, & \text{for } k \in [\![\frac{M}{2} + P_1; M - P_2[\![ \end{cases}$$

with $P_1$ and $P_2$ predefined positive integers, such as $P_1+P_2$ is strictly smaller than M/2, p a predefined integer, Q is a positive integer smaller than M/2, and ε is 1 or −1 and $X_k^*$ being the complex conjugate of $X_k$;

applying at least a M size DFT then a N size IDFT corresponding to a first transmit antenna, to the first block of M symbols to obtain a first single-carrier frequency division multiple access, SC-FDMA, symbol representing the first block of M symbols, said first SC-FDMA symbol being of a given duration;

applying at least a M size DFT then a N size IDFT corresponding to a second transmit antenna, to the second block of M symbols to obtain a second single-carrier frequency division multiple access, SC-FDMA, symbol representing the second block of M symbols, said second SC-FDMA symbol being of the given duration;

transmitting during a time interval of the given duration, respectively on the first and second transmit antennas, simultaneously the first and second SC-FDMA symbols, into the radio signal;

said device comprising:

a processor; and a non-transitory computer-readable medium comprising instructions stored thereon, which when executed by the processor configure the device to:

determine a number L smaller than or equal to min(M/2-$P_1$-$P_2$; K) of integers such as $$\{n_i \mid i \in [\![1;L]\!], P_1 \leq n_i < \frac{M}{2} - P_2, \forall\, i,j \in [\![1;L]\!]^2, i < j \Rightarrow n_i < n_j\};$$

and for each i-th quadruplet out of L quadruplets of a first, a second, a third and a fourth Reference Signals among the K quadruplet:

insert the first Reference Signal such as samples of the first Reference Signal are in positions in the first SC-FDMA symbol dependent on a position $n_i$ of the symbol $X_{n_i}$ in the first block of M symbols;

insert the second Reference Signal such as samples of the second Reference Signal are in positions in the first SC-FDMA symbol dependent on the position $$\frac{M}{2} + P_1 + \mod(-n_i + P_1 + p - 1, Q)$$

of the symbol $$X_{\frac{M}{2}+P_1+mod(-n_i+P_1+p-1,Q)}$$

in the first block of M symbols;

insert the third Reference Signal such as samples of the third Reference Signal are in positions in the second SC-FDMA symbol dependent on a position $n_i$ of the symbol $X_{n_i}$ in the first block of M symbols;

insert the fourth Reference Signal such as samples of the fourth Reference Signal are in positions in the second SC-FDMA symbol dependent on the position $$\frac{M}{2} + P_1 + \mod(-n_i + P_1 + p - 1, Q)$$

of the symbol $$X_{\frac{M}{2}+P_1+mod(-n_i+P_1+p-1,Q)}$$

in the first block of M symbols.

16. A method for extracting K quadruplets of a first, a second, a third and a fourth Reference Signals in a radio signal received over a wireless communication system, said radio signal being emitted by an emitter comprising at least two transmit antennas, each transmit antenna being configured for transmitting on at least an even number M, strictly greater than 1, of different frequencies, and K being a strictly positive integer smaller than or equal to M/2, the emission of the radio signal being processed by:

applying a first block of M symbols $X=(X_0, \ldots X_{M-1})$ to a precoder to obtain a second block of M symbols $Y=(Y_0, \ldots Y_{M-1})$, with $$Y_k = \begin{cases} \varepsilon X^*_{\frac{M}{2}+P_1+mod(-k+P_1+p-1,Q)}, \text{ for } k \in [\![P_1; \frac{M}{2}-P_2[\![ \\ -\varepsilon X^*_{P_1+mod(-k+P_1+\frac{M}{2}+p-1,Q)}, \text{ for } k \in [\![\frac{M}{2}+P_1; M-P_2[\![ \end{cases},$$

with $P_1$ and $P_2$ predefined positive integers, such as $P_1+P_2$ is strictly smaller than M/2, p a predefined integer, Q is a positive integer smaller than M/2, and $\varepsilon$ is 1 or −1 and $X_k^*$ being the complex conjugate of $X_k$;

applying at least a M size DFT then a N size IDFT corresponding to a first transmit antenna, to the first block of M symbols to obtain a first single-carrier frequency division multiple access, SC-FDMA, symbol representing the first block of M symbols, said first SC-FDMA symbol being of a given duration;

applying at least a M size DFT then a N size IDFT corresponding to a second transmit antenna, to the second block of M symbols to obtain a second single-carrier frequency division multiple access, SC-FDMA, symbol representing the second block of M symbols, said second SC-FDMA symbol being of the given duration;

transmitting during a time interval of the given duration, respectively on the first and second transmit antennas, simultaneously the first and second SC-FDMA symbols, in the radio signal;

said first, second, third and fourth reference signals being inserted in the radio signal by:

determining a number L smaller than or equal to min(M/2−$P_1$−$P_2$; K) of integers such as $$\{n_i \mid i \in [\![1; L]\!], P_1 \le n_i < \frac{M}{2}-P_2, \forall i, j \in [\![1; L]\!]^2, i < j \Rightarrow n_i < n_j\};$$

and for each i-th quadruplet out of L quadruplets of a first, a second, a third and a fourth Reference Signals among the K quadruplets:

inserting the first Reference Signal such as samples of the first Reference Signal are in positions in the first SC-FDMA symbol dependent on a position $n_i$ of the symbol $X_{n_i}$ in the first block of M symbols;

inserting the second Reference Signal such as samples of the second Reference Signal are in positions in the first SC-FDMA symbol dependent on the position $$\frac{M}{2}+P_1+\mathrm{mod}(-n_i+P_1+p-1, Q)$$

of the symbol $$X_{\frac{M}{2}+P_1+mod(-n_i+P_1+p-1,Q)}$$

in the first block of M symbols;

inserting the third Reference Signal such as samples of the third Reference Signal are in positions in the second SC-FDMA symbol dependent on a position $n_i$ of the symbol $X_{n_i}$ in the first block of M symbols;

inserting the fourth Reference Signal such as samples of the fourth Reference Signal are in positions in the second SC-FDMA symbol dependent on the position $$\frac{M}{2}+P_1+\mathrm{mod}(-n_i+P_1+p-1, Q)$$

of the symbol $$X_{\frac{M}{2}+P_1+mod(-n_i+P_1+p-1,Q)}$$

in the first block of M symbols;

said method comprising for at least one quadruplet i of first, second, third and fourth Reference Signals among the L quadruplets:

extracting, before applying N size DFT on the received radio signal, parts of the radio signal, each part being received in one time window among time windows, said time windows being strictly included in the given time interval;

processing said extracted parts independently from other parts of the received radio signal.

17. The method according to claim 16, wherein each time window among the time windows strictly includes at least one time period corresponding to the receiving of samples in a position among the positions in the first and/or second SC-FDMA symbols.

18. The method according to claim 16, wherein each time window among the time windows is strictly included in at least one time period corresponding to the receiving of samples in a position among the positions in the first and/or second SC-FDMA symbols.

19. The method according to claim 16, wherein each time window among the time windows is equal to one time period corresponding to the receiving of samples in a position among the positions in the first and/or second SC-FDMA symbols.

20. A device for extracting K quadruplets of a first, a second, a third and a fourth Reference Signals in a radio signal received over a wireless communication system, said radio signal being emitted by an emitter comprising at least two transmit antennas, each transmit antenna being configured for transmitting on at least an even number M, strictly greater than 1, of different frequencies, and K being a strictly positive integer smaller than or equal to M/2, the emission of the radio signal being processed by:

applying a first block of M symbols $X=(X_0, \ldots X_{M-1})$ to a precoder to obtain a second block of M symbols $Y=(Y_0, \ldots Y_{M-1})$, with $$Y_k = \begin{cases} \varepsilon X^*_{\frac{M}{2}+P_1+mod(-k+P_1+p-1,Q)}, & \text{for } k \in [\![P_1; \frac{M}{2}-P_2[\![ \\ -\varepsilon X^*_{P_1+mod(-k+P_1+\frac{M}{2}+p-1,Q)}, & \text{for } k \in [\![\frac{M}{2}+P_1; M-P_2[\![' \end{cases}$$

with $P_1$ and $P_2$ predefined positive integers, such as $P_1+P_2$ is strictly smaller than M/2, p a predefined integer, Q is a positive integer smaller than M/2, and ε is 1 or −1 and $X_k^*$ being the complex conjugate of $X_k$;

applying at least a M size DFT then a N size IDFT corresponding to a first transmit antenna, to the first block of M symbols to obtain a first single-carrier frequency division multiple access, SC-FDMA, symbol representing the first block of M symbols, said first SC-FDMA symbol being of a given duration;

applying at least a M size DFT then a N size IDFT corresponding to a second transmit antenna, to the second block of M symbols to obtain a second single-carrier frequency division multiple access, SC-FDMA, symbol representing the second block of M symbols, said second SC-FDMA symbol being of the given duration;

transmitting during a time interval of the given duration, respectively on the first and second transmit antennas, simultaneously the first and second SC-FDMA symbols, into the radio signal;

said first, second, third and fourth reference signals being inserted in the radio signal by:

determining a number L smaller than or equal to min(M/2−$P_1$−$P_2$; K) of integers such as $$\left\{ n_i \middle| i \in [\![1;L]\!], P_1 \le n_i < \frac{M}{2} - P_2, \forall i, j \in [\![1;L]\!]^2, i < j \Rightarrow n_i < n_j \right\};$$

and for each i-th quadruplet out of L quadruplets of a first, a second, a third and a fourth Reference Signals among the K quadruplets:

inserting the first Reference Signal such as samples of the first Reference Signal are in positions in the first SC-FDMA symbol dependent on a position $n_i$ of the symbol $X_{n_i}$ in the first block of M symbols;

inserting the second Reference Signal such as samples of the second Reference Signal are in positions in the first SC-FDMA symbol dependent on the position $$\frac{M}{2} + P_1 + mod(-n_i + P_1 + p - 1, Q)$$

of the symbol $$X_{\frac{M}{2}+P_1+mod(-n_i+P_1+p-1,Q)}$$

in the rust block of M symbols;

inserting the third Reference Signal such as samples of the third Reference Signal are in positions in the second SC-FDMA symbol dependent on a position $n_i$ of the symbol $X_{n_i}$ in the first block of M symbols;

inserting the fourth Reference Signal such as samples of the fourth Reference Signal are in positions in the second SC-FDMA symbol dependent on the position $$\frac{M}{2} + P_1 + mod(-n_i + P_1 + p - 1, Q)$$

of the symbol $$X_{\frac{M}{2}+P_1+mod(-n_i+P_1+p-1,Q)}$$

in the first block of M symbols;

said device comprising:

a processor; and a non-transitory computer-readable medium comprising instructions stored thereon, which when executed by the processor configure the device to, for at least one quadruplet i of first, second, third and fourth Reference Signals:

extract, before applying N size DFT modules on the received radio signal, parts of the radio signal, each part being received in one time window among time windows, said time windows being strictly included in the given time interval;

process said extracted parts independently from other parts of the received radio signal.

* * * * *